May 11, 1965   H. C. SIBLEY   3,183,350
SYSTEM FOR DETECTING HOT ELEMENTS ON RAILWAY VEHICLES
Original Filed Oct. 30, 1959   13 Sheets-Sheet 1

INVENTOR.
H.C. SIBLEY
BY
HIS ATTORNEY

May 11, 1965  H. C. SIBLEY  3,183,350

SYSTEM FOR DETECTING HOT ELEMENTS ON RAILWAY VEHICLES

Original Filed Oct. 30, 1959  13 Sheets-Sheet 2

INVENTOR.
H.C. SIBLEY
BY
*Forest B. Hitchcock*
HIS ATTORNEY

May 11, 1965

H. C. SIBLEY 3,183,350

SYSTEM FOR DETECTING HOT ELEMENTS ON RAILWAY VEHICLES

Original Filed Oct. 30, 1959

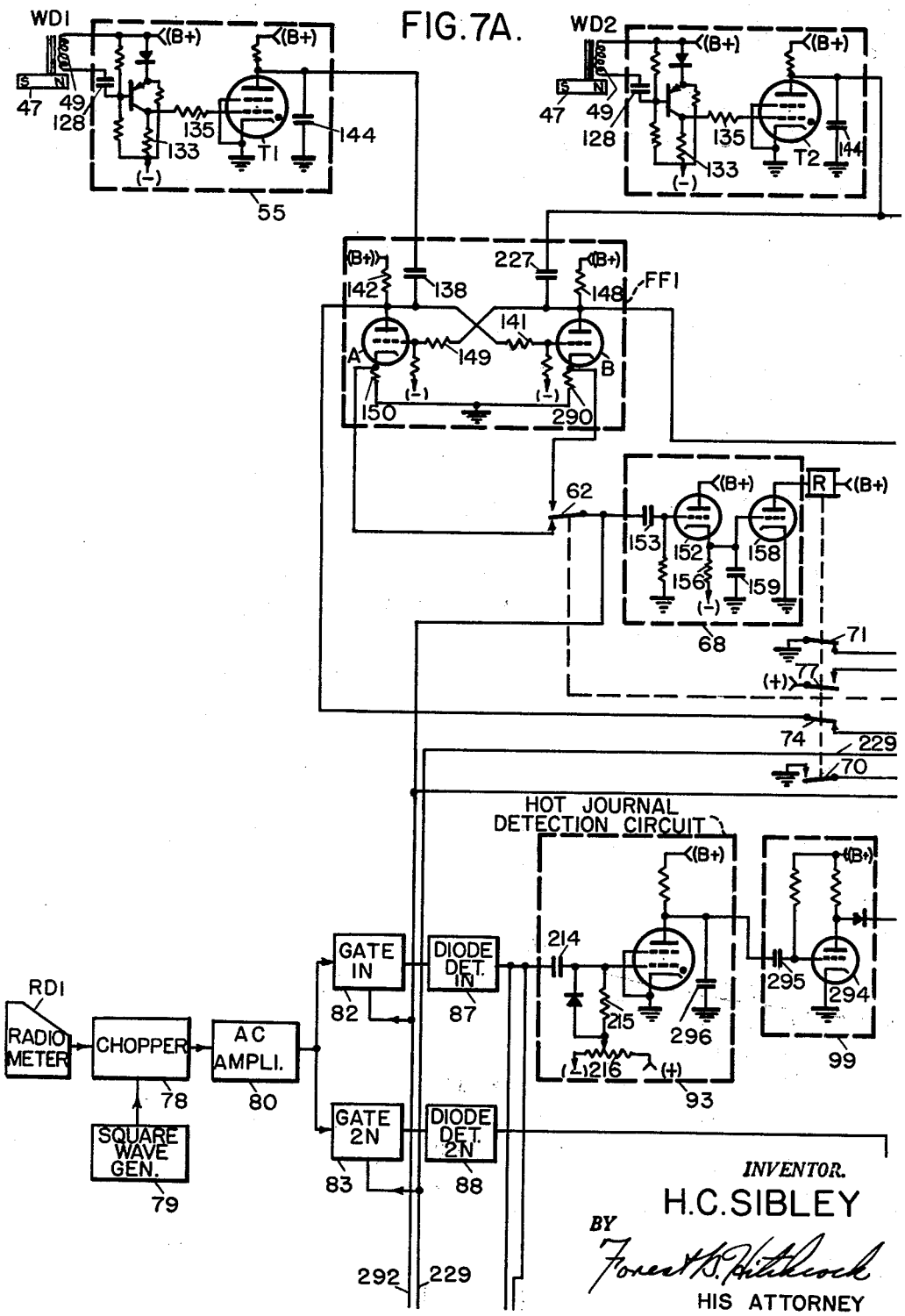

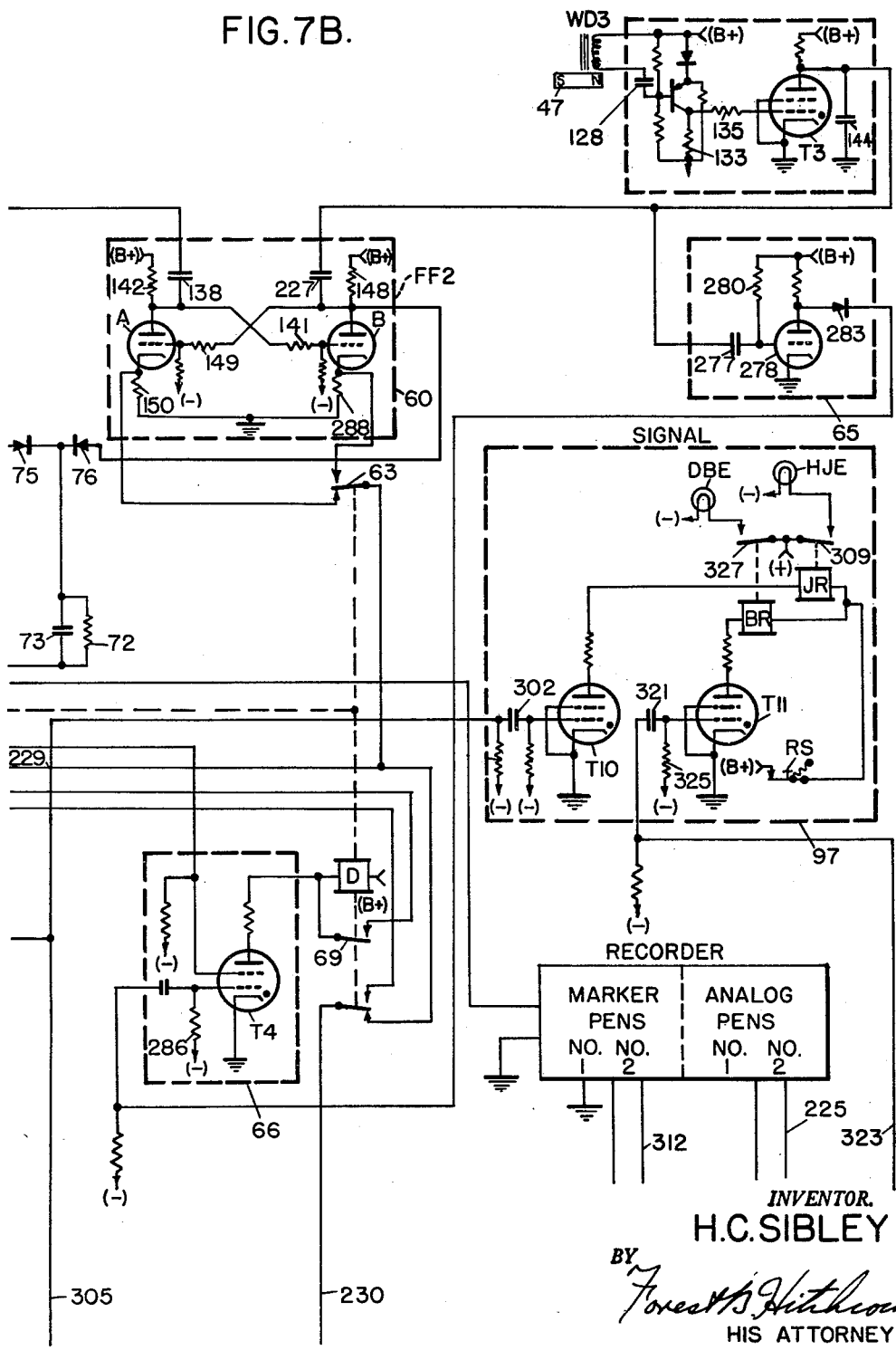

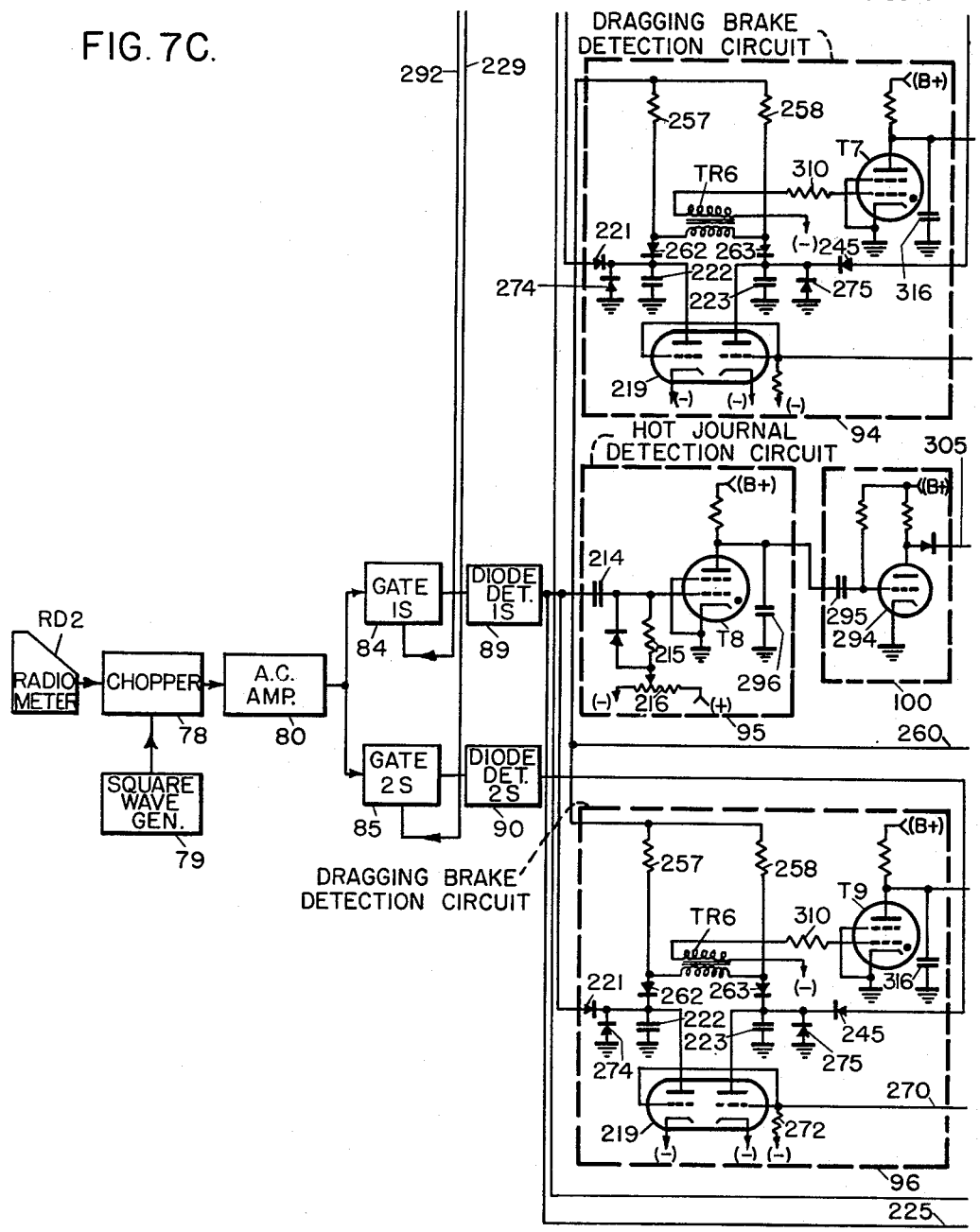

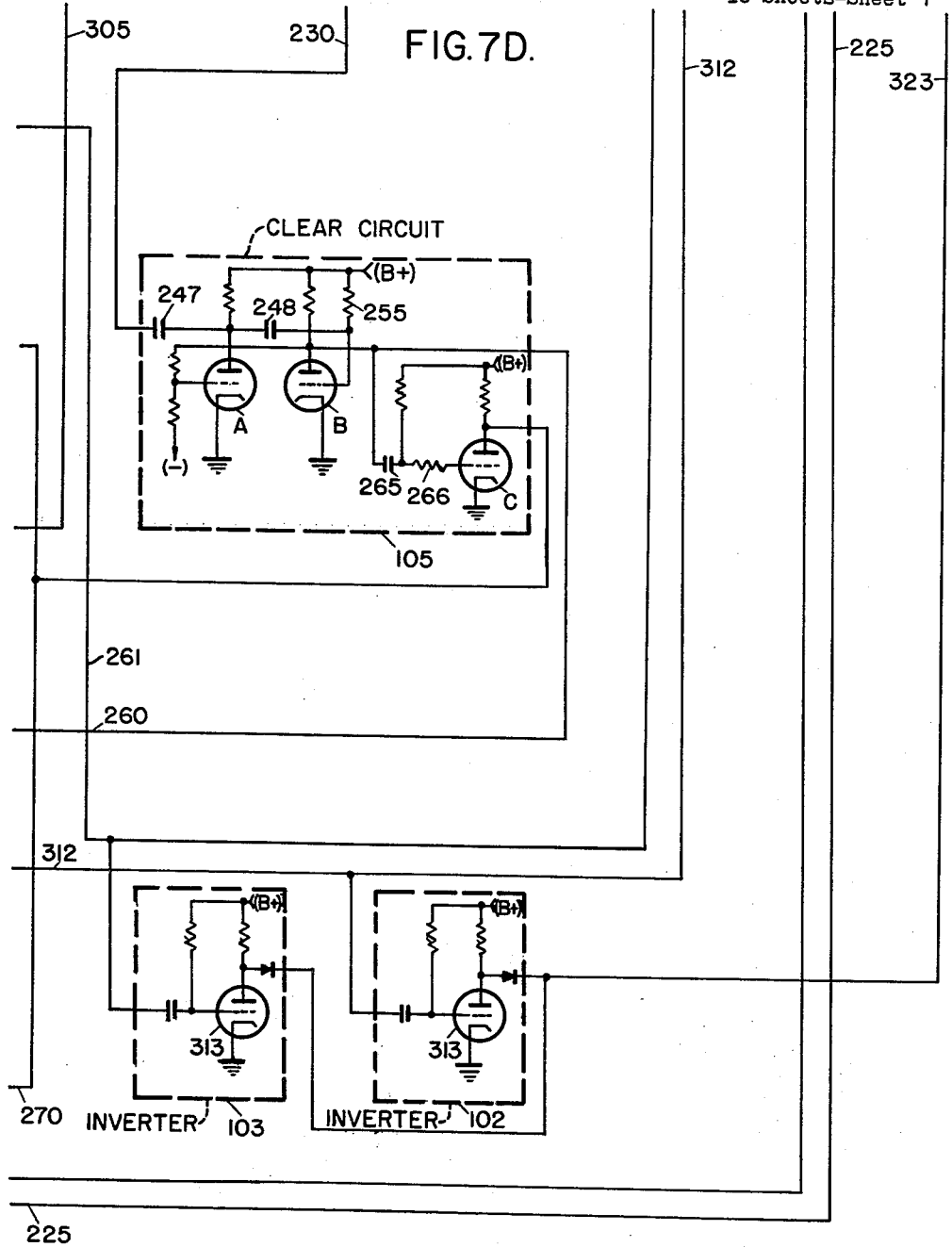

May 11, 1965     H. C. SIBLEY     3,183,350
SYSTEM FOR DETECTING HOT ELEMENTS ON RAILWAY VEHICLES
Original Filed Oct. 30, 1959     13 Sheets-Sheet 8

*INVENTOR.*
H.C. SIBLEY
BY
HIS ATTORNEY

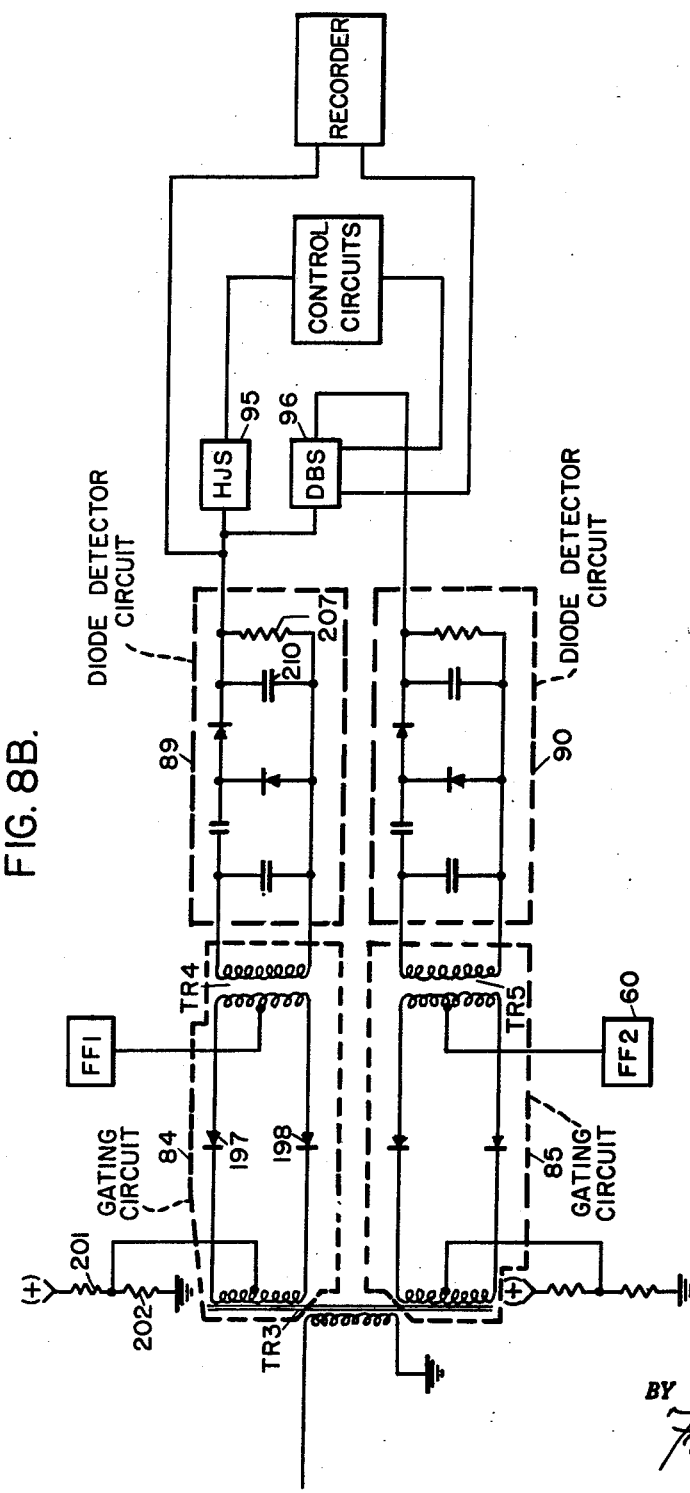

May 11, 1965  H. C. SIBLEY  3,183,350
SYSTEM FOR DETECTING HOT ELEMENTS ON RAILWAY VEHICLES
Original Filed Oct. 30, 1959  13 Sheets-Sheet 10

ASSUME:-
(1) TRAIN MOVING W-E
(2) NO HOT JOURNAL
(3) NO DRAGGING BRAKES

ASSUME:-
(1) TRAIN MOVING E-W
(2) ONE HOT JOURNAL
(3) NO DRAGGING BRAKES

INVENTOR.
H.C. SIBLEY
BY
*[signature]*
HIS ATTORNEY

May 11, 1965 H. C. SIBLEY 3,183,350
SYSTEM FOR DETECTING HOT ELEMENTS ON RAILWAY VEHICLES
Original Filed Oct. 30, 1959 13 Sheets-Sheet 11

ASSUME:-
(1) TRAIN MOVING W-E
(2) NO HOT JOURNAL
(3) DRAGGING BRAKES

*INVENTOR.*
H.C. SIBLEY
BY
HIS ATTORNEY

May 11, 1965     H. C. SIBLEY     3,183,350
SYSTEM FOR DETECTING HOT ELEMENTS ON RAILWAY VEHICLES
Original Filed Oct. 30, 1959     13 Sheets-Sheet 12
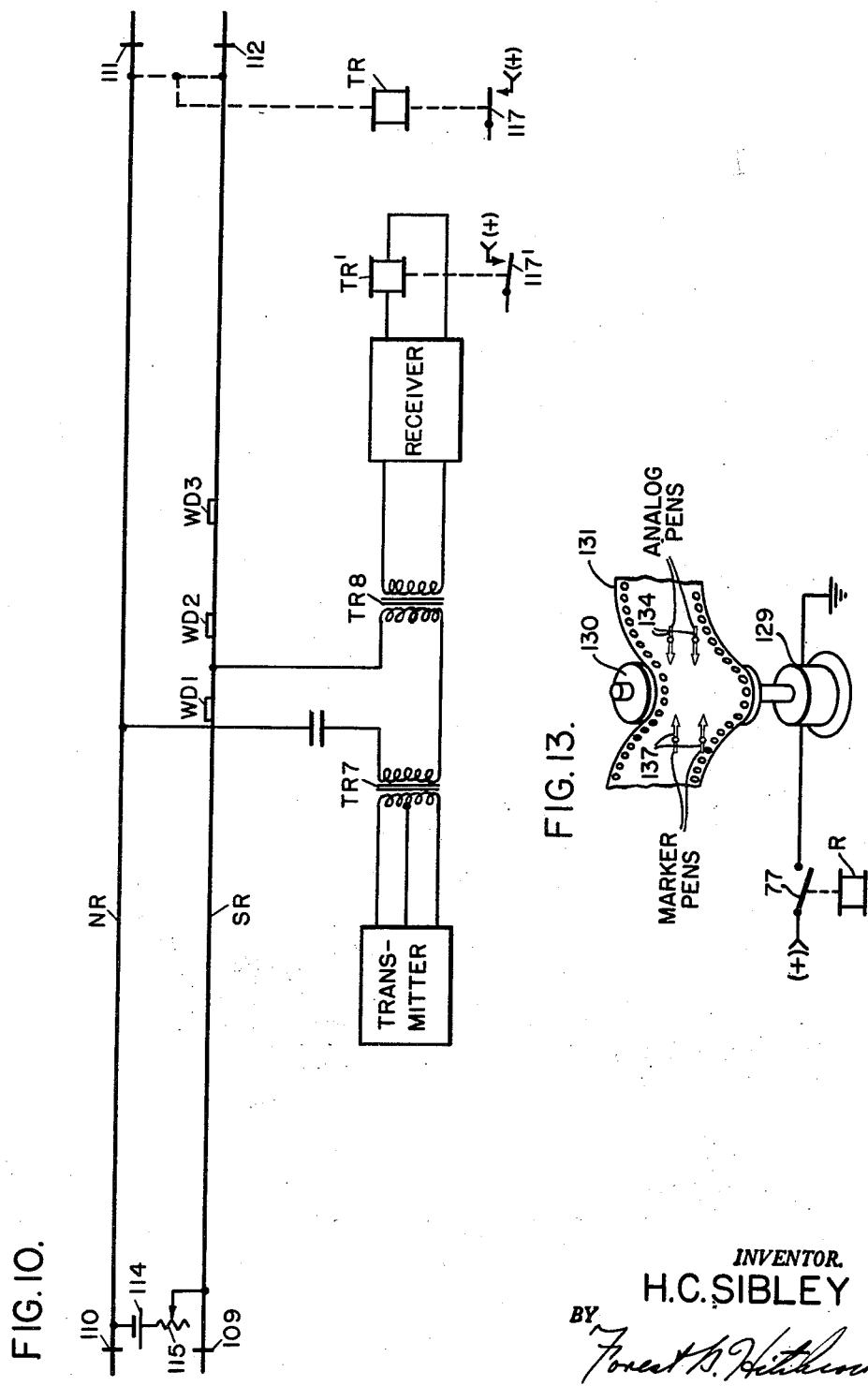
INVENTOR.
H.C. SIBLEY
BY
HIS ATTORNEY May 11, 1965   H. C. SIBLEY   3,183,350
SYSTEM FOR DETECTING HOT ELEMENTS ON RAILWAY VEHICLES
Original Filed Oct. 30, 1959   13 Sheets-Sheet 13

INVENTOR.
H.C.SIBLEY
BY
HIS ATTORNEY

United States Patent Office 3,183,350
Patented May 11, 1965

3,183,350
SYSTEM FOR DETECTING HOT ELEMENTS
ON RAILWAY VEHICLES
Henry C. Sibley, Rochester, N.Y., assignor to
General Signal Corporation
Continuation of application Ser. No. 849,880, Oct. 30,
1959. This application Feb. 9, 1960, Ser. No. 7,727
8 Claims. (Cl. 246—169)

This is a continuation of application Serial No. 849,880, filed October 30, 1959, and now abandoned.

The present invention relates to a system for detecting hot elements on railway vehicles, and more particularly pertains to the detection of overheated journals and also dragging brakes on railway vehicles.

Despite the unremitting efforts of American railroads to maintain their equipment at a high level of efficiency and safety, it is an acknowledged fact that the single principal cause of accidents on railroads results from the overheating of the bearings of railway cars, particularly freight cars. Although frequent inspections are made and bearings are regularly lubricated, it is still a relatively frequent happening for a journal to become overheated to a sufficient extent that the car itself may catch on fire or there may be violent, intermittent seizures of the axle so that it is eventually sheared off. Since a high standard of inspection and maintenance has not been able to reduce the resulting damages to a satisfactory level, it has become necessary to resort to means which will detect an incipient overheated bearing condition and provide a warning thereof before the condition becomes dangerous.

Another condition frequently resulting in damage occurs as the result of the inadvertent dragging of the brakes. Although the brakes on the train may be properly released by the trainman, it nevertheless sometimes occurs that the brakes on a single wheel or, even more often, all the brakes on a particular truck, are actually not released but are instead tightly held against the wheels, sometimes to such an extent that the wheels are entirely prevented from rotating. The consequent sliding of such wheels not only causes flat spots to develop thereon, but also increases the possibility of derailment. Where the dragging brakes are not so tightly clamped against the wheel so as to stop rotation, there is nevertheless a great amount of heat generated by the dragging of the brakes and this may be transmitted through the wheel to its hub, and thence over the axle to the journal, where it may result in deterioration of the lubricant so that a hot journal box may result therefrom.

With respect to the problem of detecting overheated journals, various expedients have been devised in an attempt to solve this problem. More recently, these attempts have taken the form of providing a radiation detection device alongside the trackway. This device may comprise a bolometer sensitive to infrared rays or a thermocouple. The general practice is to scan the successive journal boxes themselves with the radiation detection device in such a manner that an output signal is derived for each passing journal whose amplitude is proportional to the journal box temperature. Associated equipment is responsive to this output signal and provides a distinctive signal, either visual or audible, to indicate the presence of an overheated journal. Such equipment has been found to have real merit, but experience with it indicates that there are, nevertheless, several shortcomings connected with it. For example, under certain conditions an overheated journal is not detected by the equipment. At other times, an indication of an overheated journal will be given when there is, in fact, no overheated journal at all, and this sort of error, although on the side of safety, is nevertheless detrimental in that unnecessary stopping of railway trains has a highly adverse effect upon operating costs. It is additionally a characteristic of these prior systems that they do not provide any detection of dragging or locked brakes.

In view of these several drawbacks of the detection systems of the prior art, it is proposed by this invention to provide a system for the detection, not only of overheated journals, but also of dragging or locked brakes. As will be seen, the added function of dragging brake detection uses in common much of the equipment used for the detection of overheated journals so that considerable economy of equipment results. In addition, a considerable increase in reliability of detection of overheated journals is experienced through use of the present invention.

Described briefly, it is contemplated to provide a radiation detection device, or "radiometer," which is positioned alongside the track rail and is so located and directed that it scans the infrared radiation level of each wheel hub rather than the journal itself. Whenever there is an overheated journal, the heat is conducted away from the journal box wherein it is generated, over the axle to the hub of the wheel, and to the body of the wheel which tends to act as heat sink. Experimentation has shown that even an incipient overheated journal condition will result in an appreciable rise in temptrature of the wheel hub above ambient temperature. Scanning the successive wheel hubs rather than the journal boxes produces several distinct and important advantages.

One of these advantages results from the fact that the bearings of a car equipped with roller bearings normally run at nearly the same temperatures as the bearings of the more common type of freight car having the sliding-bearing type of construction. However, the journal boxes for the roller bearings are so constructed as to more readily receive the heat generated in the journal and dissipate it to the outside than does the construction of the journal boxes for the plane or sliding type bearings. Because of this, the scanning of journal boxes for roller bearings under normal conditions tends to give unreliable information since each such journal box tends to provide a higher level of output signal from the radiometer than is produced by scanning journal boxes of sliding type bearings under normal conditions and thus gives an erroneous hot journal indication. Although various expedients have been devised in an attempt to overcome this problem, none has proved entirely successful. On the other hand, the scanning of the wheel hubs rather than the journal boxes as contemplated by the present invention completely eliminates this problem since it has been found that the wheel hub of a roller bearing equipped car is not substantially different in temperature than the usually sliding type bearing.

Another distinct advantage which is derived from scanning the wheel hub rather than the journal box is the abality to scan also the wheel rims and the brakes. Thus, by directing the angle of scan toward the wheel hub and across the plane of the wheel, the angle of scan will not only scan each wheel hub, but will as well scan the face of the wheel outwardly of the hub including the wheel web or plate and also the wheel rims and even the brake shoes as will subsequently be seen. The foregoing results are achieved, as already described, in part by so positioning the radiometer and directing its angle of scan that it scans each wheel hub, and by also directing the scanning beam across the plane of the wheel at a level such that each wheel rim and also each brake shoe subtend the scanning angle of the radiometer.

It has been known in the art that inside wheel hubs might be scanned to obtain thereby indications as to the temperatures of the respective journals. However, it has been believed necessary, in systems where wheel hub scanning has been contemplated, to direct the scanning beam generally parallel to the track rails, and this has the considerable disadvantage that two scanning devices are then required on each side of the trackway, one for each direction of train travel. Alternatively, it has been contemplated to use but a single scanning unit, but to direct its beam of scan directly upwards toward inside axles. Then, only one unit is required for both directions of travel, but this arrangement has the attendant disadvantage of placing the viewing window in a horizontal position so that dirt and snow readily obscure it. In the present invention, by contrast, the beam of scan is in a plane generally perpendicular to the track rails and directed upwardly across the plane of the wheels, making an angle of about forty degrees to the horizontal. Because of this, none of the above disadvantages are encountered since only one radiometer unit is needed for both directions of travel and yet the viewing window is at an angle such that it is well protected from dirt or snow accumulations. Moreover, when wheel hub scanning has been previously contemplated, it has been thought to be necessary that the radiometer be placed between the track rails and directed toward the hub on the inside of each wheel rather than the outside. Tests have shown that there is a considerable disadvantage in such an arrangement because of the considerably longer time required for journal heat to travel to such inside hub thereby introducing a considerable delay in the indication of an abnormal condition and also because of the considerably lower temperatures of the inside wheel hub which makes it difficult to obtain radiation readings.

In addition to positioning the radiometer as described above, it is preferably so positioned and directed that its angle of scan is also subtended by each coupler between successive cars. The object of doing this is to prevent the radiometer from scanning the sky between successive cars and particularly to prevent its receiving direct radiation from the sun since this might cause serious damage to the device. This permits directing the radiometer's beam of scan upwardly while, at the same time, obviating the need for a fast-acting shutter which will close between successive cars.

Another advantage of scanning the hubs of the wheels is that they are generally very well sheltered from the direct rays of the sun; whereas, the journal boxes covering the journals extend beyond the frame of the trucks and do receive the direct rays of the sun. When the direct rays of the sun are on the journal boxes of one side of a car and not the other, such condition tends to produce signals indicative of overheated journals although such is not the case. The scanning of the outside hubs of the wheels minimizes this effect considerably.

Because of the desire to scan not only successive wheel hubs with a single radiometer but also wheel rims, means must be employed to differentiate between the different signals received from the different sources of radiation. This is accomplished by a novel gating circuit organization which distinguishes between the signals received by a single radiometer from a wheel hub and associated brake shoe so that separate distinctive indications can be given for the overheated journal condition and the dragging brake condition. It is, of course, desired that the same equipment be effective for either direction of travel of the train. This poses additional problems which will be more apparent from the detailed description that follows since the gating circuits must recognize that the train is traveling in one particular direction or the other and control the gating circuits accordingly so that the respective signals from wheel hubs and wheel rims do not become intermixed and produce erroneous output information.

It has already been described that the wheel hub becomes readily overheated when there is an overheated journal. It is also plausible, therefore, that an overheated journal condition would as well result in an overheating of the wheel rim, and experiments have indicated that this does indeed occur. For this reason, merely scanning a wheel rim and detecting that its temperature is more than some predetermined amount above ambient is not sufficient to give a reliable indication of a dragging brake condition since such temperature rise might also have been caused by an overheated journal condition. To eliminate this ambiguity, the present invention incorporates comparison means which compares the infrared radiation level derived from the wheel rim as compared to that derived from the wheel hub for the same wheel. This comparison circuit is so organized that a dragging brake condition will be given only when the signal obtained from the wheel rim exceeds by a predetermined amount the signal obtained from the wheel hub. Thus, if the elevated rim temperature has come about as a result of an overheated journal condition, it must necessarily be true that the wheel hub is at a higher temperature than the wheel rim; in that event, no dragging brake detection signal is given. However, when the opposite conditions obtain, i.e. the wheel rim is at a higher temperature than the wheel hub, this is a quite certain indication that the elevated temperature of the wheel rim has come about as a result of a dragging brake condition.

Each radiometer is provided with a protective shutter mechanism which normally prevents infrared radiation from impinging upon the detector element. This shutter is opened when detection apparatus at the radiometer location indicates that a train is present. Ordinarily, the shutter remains open after the train has passed the radiometer location until an associated track circuit becomes unoccupied. There may be some lapse of time after the last car of the train has passed the radiometer location before the track section becomes unoccupied, and this is particularly true, of course, if the train should stop in the track section after having passed the radiometer location. Under these circumstances, it is desirable that the shutter be closed in the event that any high level of radiation is being directed onto the infrared detector. For this purpose, a light sensitive cell is included in the radiometer. Any direct sunlight which might otherwise damage the infrared detector will then impinge also upon the light cell and the output therefrom is utilized to close the shutter and thereby protect the radiation sensing element.

It is accordingly a feature of this invention to detect overheated journals on railways cars by employing a radiometer whose angle of scan is directed toward the hubs of passing wheels and which is also so positioned and directed that its beam of scan includes the coupler between successive cars.

Another object of this invention is to provide a detection system employing a radiometer which scans both the hubs of passing wheels and also the wheel rims and brakes to thereby provide indications, not only of overheated journals, but also of dragging brakes.

An additional object of this invention is to provide a system for detecting overheated journals on railway cars wherein a radiometer unit scans the wheel hubs of passing cars but where only a single such unit is required on each side of the trackway for both directions of travel and yet the unit is at an angle with respect to the horizontal so that dirt and snow does not tend to accumulate on the viewing window.

Another object of this invention is to provide a detection system employing a radiometer which scans both the hubs of passing wheels and also wheel rims and brakes and employs gating circuit means which is effective to provide separate signals for overheated journals and dragging brakes.

Another object of this invention is to provide a detection system for separately detecting oveheated journals and dragging brakes of railway cars which employs gating circuit means effective to distinguish between the different signals received respectively from wheel hubs and wheel rims for either direction of train movement.

Another object of this invention is to provide a detection system for overheated journals of railway vehicles employing a protective shutter mechanism for the infrared detecting element which is automatically operated in response to unusually high levels of received radiation to close the shutter.

Other objects, purposes, and characteristic features of this invention will be in part obvious from the accompanying drawings and in part pointed out as the description of the invention progresses.

In describing the invention in detail, reference will be made to the accompanying drawings in which like reference characters designate corresponding parts throughout the several views, and in which.

Figure 8A:
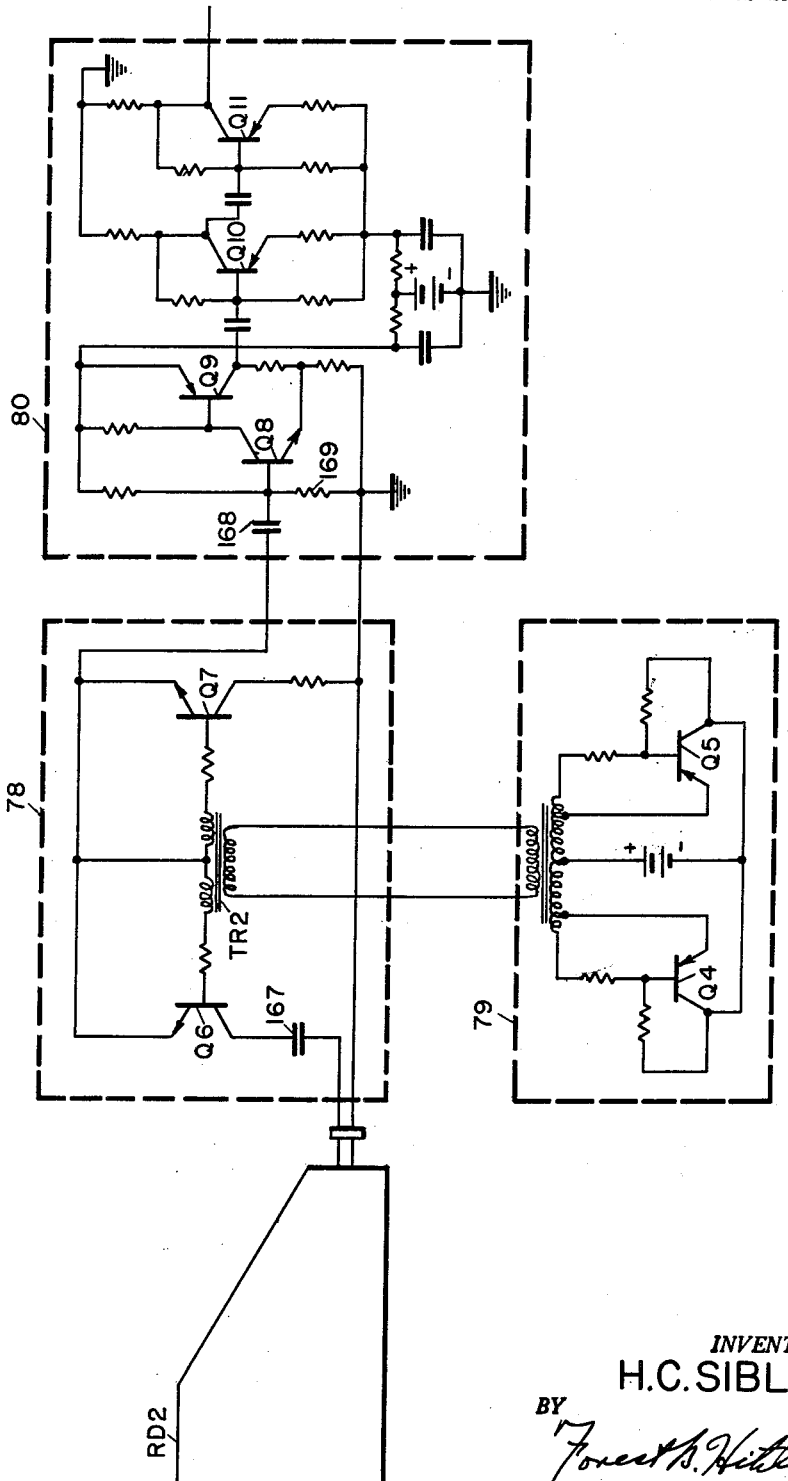
Figure 9A:
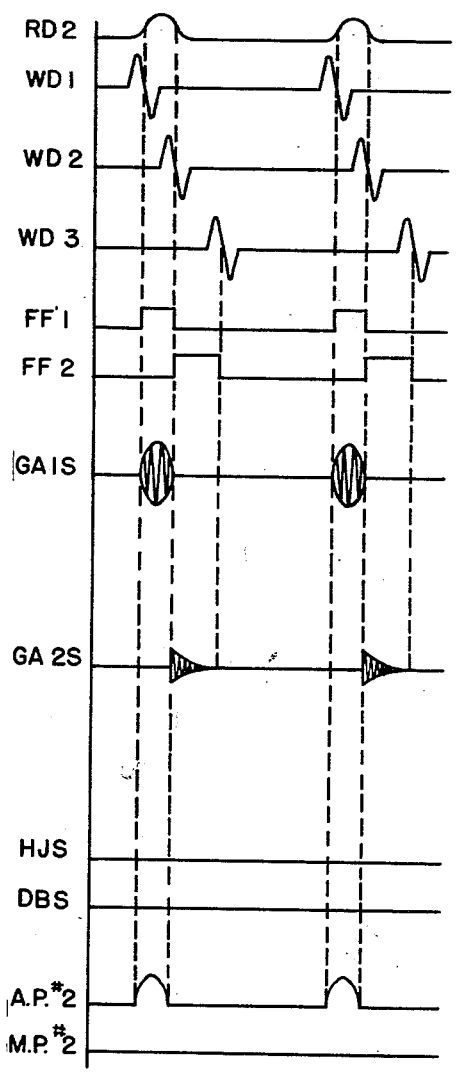
Figure 9B:
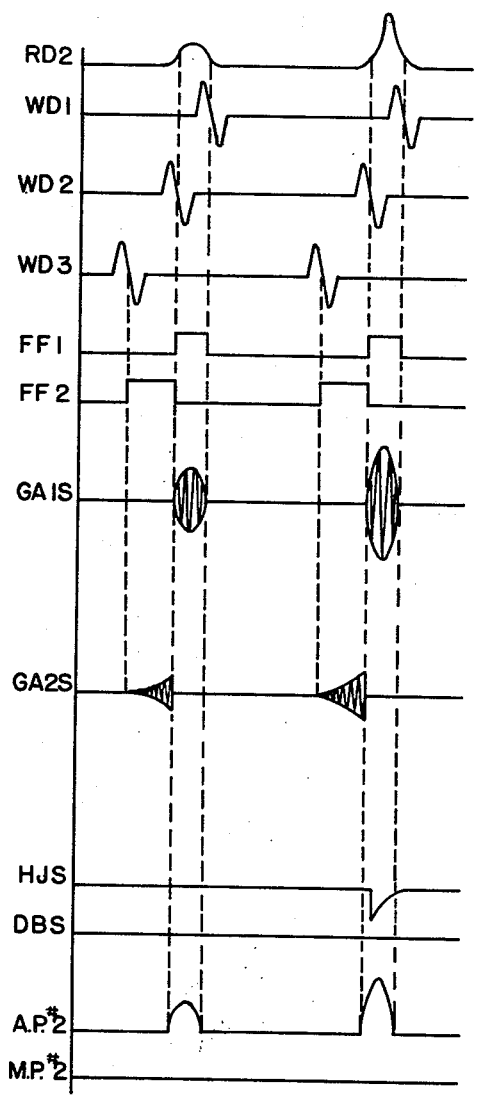
Figure 9C:
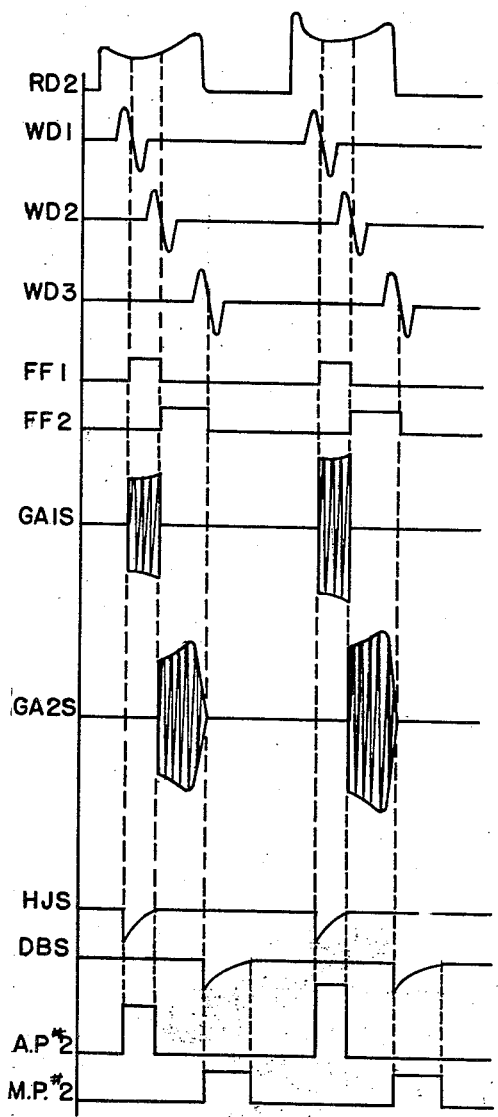
Figure 11B:
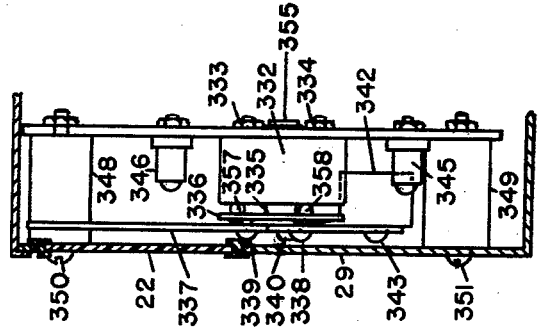
Figure 11A:
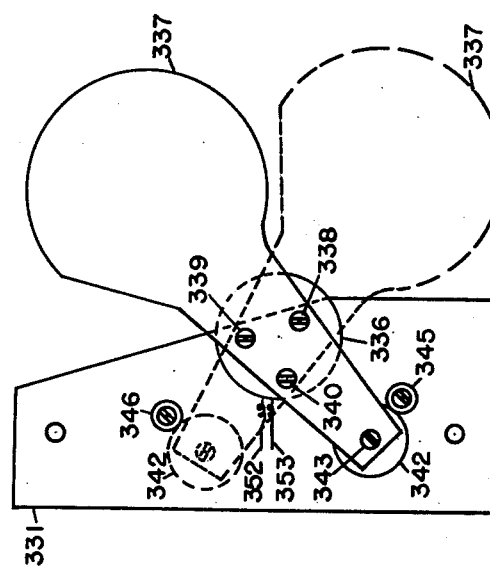
Figure 12:
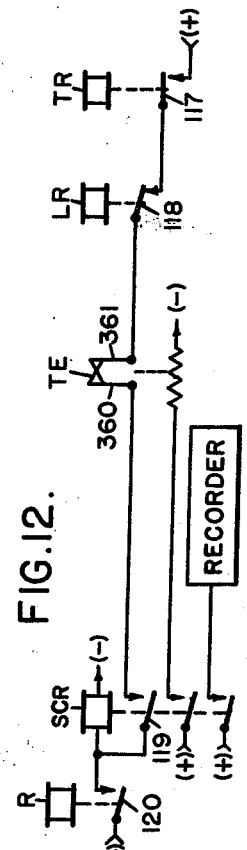

FIGS. 7A, 7B, 7C and 7D when arranged with FIGS. 7B and 7D respectively to the right of FIGS. 7A and 7C respectively and with FIGS. 7A and 7B respectively above FIGS. 7C and 7D, illustrate in a detailed manner the circuit organization of this invention;

FIGS. 8A and 8B illustrate the amplifying circuits for a radiometer unit;

FIGS. 9A, 9B and 9C are waveform diagrams illustrating the operation of the circuit organization of FIGS. 7A, 7B, 7C and 7D and FIGS. 8A and 8B;

FIG. 10 shows an electronic track circuit organization for the control of a track relay indicating train presence in the present invention;

FIG. 11A is a front view of an alternative form of shutter for a radiometer unit;

FIG. 11B is a partial side view illustrating the alternative shutter of FIG. 11A;

FIG. 12 illustrates an alternative circuit for providing driving energy for the motor of the recorder during passage of the train; and FIG. 13 shows a typical section of recorder tape and tape transport means for carrying the tape.

To simplify the illustration and facilitate in the explanation, the various parts and circuits constituting the embodiment of the invention have been shown diagrammatically and certain conventional illustrations have been employed. The drawings have been made to make it easy to understand the principles and mode of operation rather than to illustrate the specific construction and arrangement of parts that might be used in practice. The various relays and their contacts are illustrated in a conventional manner, and symbols are used to indicate connections to the terminals of batteries or other sources of electric current instead of showing all of the wiring connections to such terminals. Thus, the symbols (+) and (−) indicate connections to the opposite terminals of a source of relatively low voltage suitable for the operation of various relays and transistor circuits; whereas, the symbols (B+) and (B—) indicate connections to the opposite terminals to a source of higher voltage particularly suitable to the operation of various electron tubes and a symbol for a ground connection indicates a connection to a voltage terminal intermediate between that of the (B+) and (B—).

Figure 1:
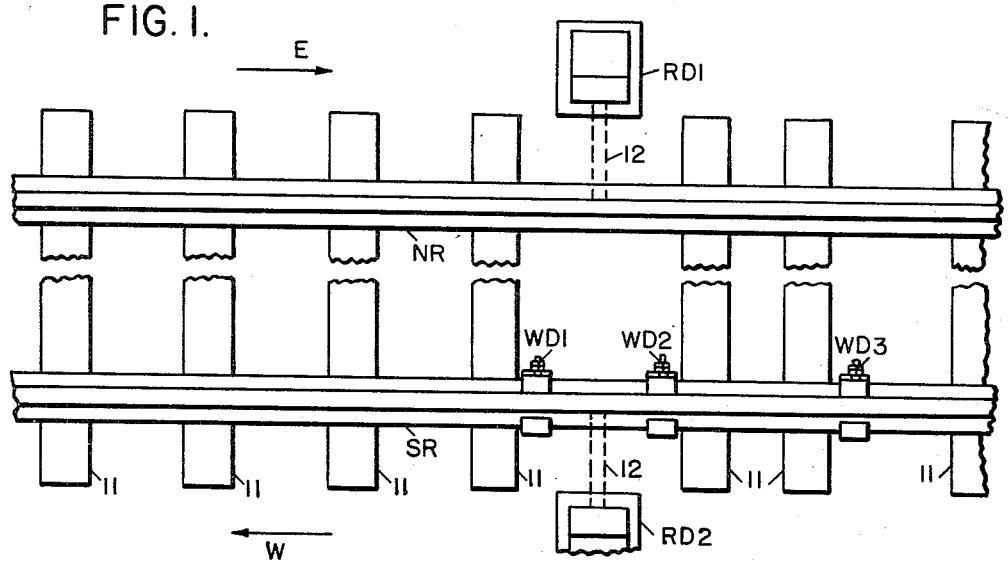
FIG. 1 is a diagrammatic illustration of a railway track having radiometers on both sides thereof and illustrating the various physical relationships involved in the positioning of said radiometers.

FIG. 1 illustrates two rails NR and SR supported by ties 11. A radiometer RD1 is located adjacent the rail NR, and a similar radiometer RD2 is located adjacent the other rail SR. Each of these radiometers scans in the direction indicated by the dotted lines 12, i.e. generally normal to the rails. The detection of each wheel is accomplished by wheel detector units such as units WD1, WD2, and WD3 which are shown in FIG. 1 as being physically connected to the rail SR.

Figure 2:
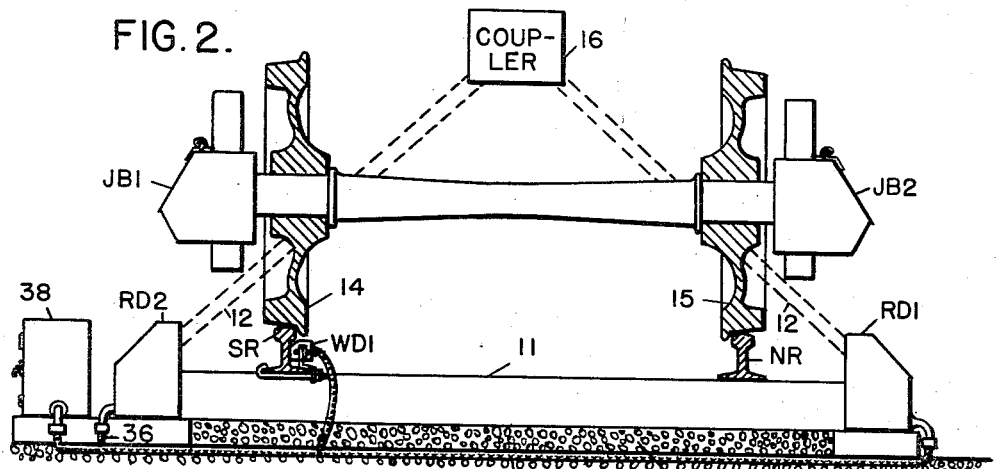
FIG. 2 is an elevational view again showing the positioning of the radiometers in respect to the wheels of a passing train and also shows the location of the wheel detectors.

FIG. 2 illustrates that the angle of scan of each radiometer as represented by the lines 12 is at an acute angle with the plane of the roadbed. Furthermore, the angle of scan is directed to intersect the plane of the wheels 14 and 15 at such a height that the hub of each wheel subtends the angle of scan as the wheel passes through the scanning beam of the radiometer. In order that the angle of scan can thus intersect each wheel hub, each radiometer must be so positioned that its viewing lens is below the level of the journal boxes JB1 and JB2. An additional criterion which helps to fix the location of each radiometer results from the desire previously mentioned that the angle of scan or viewing angle of each radiometer be also subtended by each coupler 16 between successive cars to thereby shield the radiometer from high level solar radiation and thus obviate the need for any shutter arrangement which would otherwise be required to operate for each passing car. These dual requirements, namely, that the angle of scan intersect successive wheels at the lower portion of each hub and also that it intercept each coupler between cars, quite closely determine the angle of scan as measured with respect to the plane of the track rails, and it has been found that this angle is in the order of forty degrees. As to the distance between track rail and radiometer, it is apparent from FIG. 2 that it may be variable to a certain extent since distance from the rail is related directly to elevation with respect to the rail, i.e. the radiometer may be further from the track if it is at the same time lowered so as to remain on the above-mentioned line of scan of approximately forty degrees.

Figure 3:
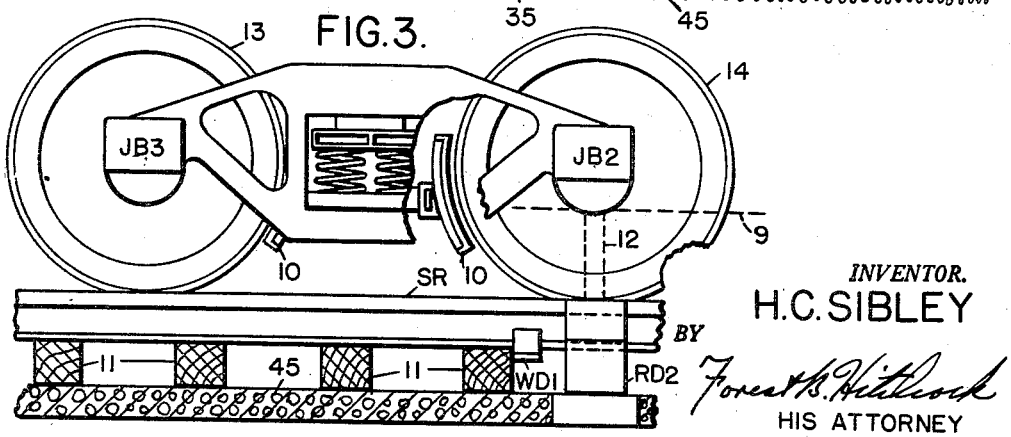
FIG. 3 is a side elevational view of a typical railway truck partially broken away to show the manner in which the brake shoes are included in the line of view along the truck as it passes such radiometers.

Referring to FIG. 3, the horizontal dotted line designated 9 indicates approximately where the angle of scan of each radiometer intersects the plane of the outside of each wheel. From this illustration it can be seen that the angle of scan not only intersects each wheel web and hub, but also the wheel rim and the brake shoes 10 associated with the respective wheels 13 and 14. FIGS. 2 and 3 also indicate connections made from the radiometers RD1 and RD2 via cables 35 and 36 respectively which may be imbedded in the ballast 45 and which conduct the signals from such units to an equipment cabinet 38 which may either be positioned near one of the radiometers as shown in FIG. 2 or be located some suitable distance away if desired.

Figure 4:
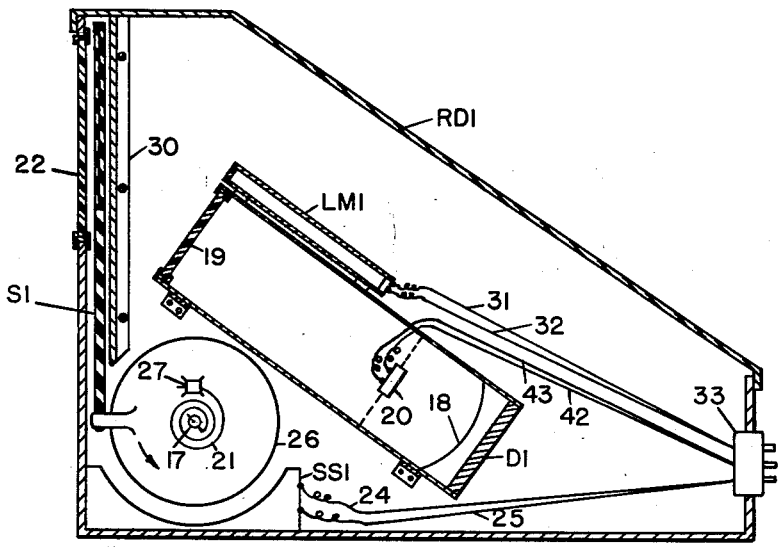
FIG. 4 is a side view of a radiometer.

A typical radiometer unit RD1 is shown in FIG. 4 as including an inclined detector assembly D1. The detector assembly includes an optical system which comprises a reflecting element 18 for focusing the heat radiation onto the infrared responsive element 20 so that an electrical output signal is obtained therefrom which is proportional in amplitude to the heat radiated from the object scanned. The electrical output signal thus derived is transmitted over wires 42 and 43 to a plug connector 33 and thence to associated control apparatus. In addition to the infrared transmitting window 19 which provides protection for the detector assembly D1, there is another window element 22 which renders the detector impervious to the elements and at the same time admits infrared energy. Directly behind this window 22 is a shutter element S1 which is normally closed as shown in FIG. 4 and thus blocks the detector assembly D1 from receiving any infrared radiation which might be impinging upon the window 22. However, when a train is present so that it is desired to scan the journals and brakes thereof, energy is applied from the plug coupler 33 and over wires 24 and 25 to solenoid SS1 which then causes the member 26 to rotate in a counterclockwise direction to thereby wind the shutter element S1 about element 26 and thereby move it out of its normal position shown in FIG. 4. Rotation of the element 26 in response to energization of the solenoid SS1 tends to tighten the spring 21 whose one end is connected to the shaft 17 and whose other end is connected to a projection 27 on member 26. Because of this tightening of the spring 21, the deenergization of the solenoid SS1 upon the passage of a train produces a clockwise rotation of member 26 so that the shutter S1 is restored to the normal position between window 22 and guide 30.

A light meter LM1 is also included in the radiometer unit and is positioned alongside the detector assembly D1. This light meter includes a photo-sensitive element which provides an electrical output signal whose amplitude is proportional to the light energy impinging thereon, and this signal is applied over wires 31 and 32 to the plug coupler 33. The use made of this signal will subsequently be described in detail, but, in brief, it may be stated that its function is to close the shutter S1 in the event that visible light, as from the sun, passes through the shutter having an intensity sufficient that it might damage the infrared detector.

GENERAL MANNER OF OPERATION

Before proceeding with the detailed description of the circuit organization of this invention, a generalized description will be given with reference to the block diagram of FIG. 5, the detailed circuit diagram of FIGS. 7A-7D, the waveform diagrams of FIGS. 9A-9C, and FIGS. 1-3 which have already been described.

As has been mentioned, each radiometer unit supplies an output signal whose amplitude is proportional to the level of infrared radiation impinging upon the detector element included therein. Because the angle of scan is directed in the manner described above, the radiometer output signal has its amplitude successively proportionate to the temperature of each passing wheel hub, and also each wheel web and rim. Thus, the output of one of the radiometer units such as the unit RD2 may appear as shown in the topmost line of the waveform diagrams of FIGS. 9A, 9B or 9C, depending upon the particular conditions encountered. When the journals associated with successive wheels are at normal operating temperatures, the radiometer output signal may appear as indicated in FIG. 9A which shows that the output increases only slightly as successive wheel hubs are scanned. FIG. 9B shows the output of the radiometer when one of the two journals on one side of a car truck is at an abnormally high temperature; the radiometer signal is shown as increasing markedly above its normal amplitude. FIG. 9C shows how the output signal of the radiometer unit RD2 may appear when the brakes associated with the wheels of the truck are both dragging. The radiometer unit receives a high level of radiation not only from the wheel hubs which are heated as a result of the conduction of heat from the wheel rims, but also receives even higher levels of radiation from the wheel rims which are directly heated through frictional contact with the brakes. The asymmetrical nature of the waveforms of the two successive wheels of the single truck as shown in FIG. 9C is readily explainable by the aid of FIG. 3 which shows that for each wheel of the truck, the brake is toward the center of the truck, and it is natural that the temperature on the center side of each wheel should be higher than on the opposite side since the former temperature reading is affected by the presence of the brake shoe itself which may be at an even higher temperature than the wheel rim.

The foregoing description shows that the output of the radiometer unit is a composite signal in that it represents the temperature of whatever is being scanned any instant and that it may go to a high value, not only when an overheated journal is being scanned, but also for overheated wheel rims or, for that matter, for any other source of infrared radiation emanating from a passing vehicle. This demonstrates the need for using gating circuits so that the output signal of the radiometer will, in effect, be interrogated to determine whether an overheated journal condition exists only at the very instant that the beam of scan of the radiometer units includes the wheel hub of a passing truck. Likewise, the gating circuits must be effective to interrogate the radiometer output signal to determine whether a dragging brake condition exists only at the particular instant that the beam of scan of the unit includes the rim of each wheel.

Various detection devices may be used to control the gating circuits so that each radiometer unit will have its output signal interrogated at the desired times. To effect this result, it has been found practical to provide a track instrument, affixed to the track rail or rails, which provides an accurate indication as to the relative position of each passing wheel with respect to the radiometer unit. The particular track instrument illustrated in the accompanying drawings and which has been found to work well in practice, employs a permanent magnet with an associated iron core coil affixed to the track rail at a preselected location. As the wheel flange passes through an inductive coupling relationship with the coil, there is a distinctive change in the flux which is provided by the permanent magnet and which links with the turns of the coil. Because of this, a voltage is induced in the coil, and this voltage is applied to an associated electronic circuit and acts thereon to cause it to apply a distinctive output pulse of uniform amplitudes to the associated gating circuits.

FIG. 1 shows that two such wheel detector units WD1 and WD2, are affixed to one of the track rails, each being substantially equidistant from the intersection with the track rail of a vertical plane through the beam of scan of the radiometer unit RD2 as indicated by the dotted lines 12. A further wheel detector unit WD3 is affixed to the same track rail and is spaced from the unit WD2 by a distance greater than the distance between the units WD1 and WD2. The units WD1 and WD2 are so positioned that in the time between successive output pulses from the wheel detector units WD1 and WD2 as a single wheel passes between these two detector units in succession, the beam of scan of the radiometer unit RD2 passes over the entire hub of that wheel. From this, it is clear that the associated gating circuit should, during this interval, interrogate the output of radiometer unit RD2 to ascertain whether its output signal is at a high level indicative of an overheated journal condition so that a distinctive signal should be given. This interrogation effected by the gating circuits should take place irrespective of the order in which the output signals from the units WD1 and WD2 are received, i.e. the interrogation should be properly effected for either direction of train travel. It will subsequently be described how this result is achieved.

During the time that each wheel is between the detector units WD2 and WD3, the angle of scan of the radiometer unit RD2 no longer includes the hub of that wheel but is now instead scanning the web and rim of that wheel. If it is assumed that the truck of FIG. 3 is passing along the rails of FIG. 1 in a direction from left to right, it can be realized that, when the center of wheel 14 lies between wheel detector units WD2 and WD3, the angle of scan of radiometer unit RD2 includes that portion of wheel 14 lying between the center thereof and the center of the truck so that not only the wheel web and rim but also the brakeshoe 10 is then being scanned. As this truck proceeds further along the track rails so that the center of wheel 13 lies between wheel detector units WD2 and WD3, the angle of scan of radiometer RD2 then includes that portion of wheel 13 lying between the center of the wheel and the outermost, left-hand end of the truck and thus does not include the brakeshoe 10 associated with wheel 13 but it does include the wheel rim. Thus, with respect to each wheel, as its center passes along the portion of rail between detector units WD2 and WD3, the wheel rim is being scanned; for alternate wheels, the brakeshoe is also included within the angle of scan, whereas for the remaining alternate wheels the brakeshoe is not included. When there is a dragging brake condition, the inclusion of the heated brakeshoe results in a greater output signal from the radiometer unit, but the dragging brake condition so elevates the wheel rim temperature that an entirely adequate determination of this condition can be made merely by scanning the wheel rim without including the brakeshoe as well in the angle of scan.

From the description previously given, it can now be realized that the gating circuit which interrogates the output of the detector unit to ascertain whether or not there is a dragging brake condition, is controlled by the output of the wheel detector units WD2 and WD3. This gating circuit is rendered active throughout the time between successive outputs from these two detector units WD2 and WD3, and this gating circuit is effective also irrespective of the order in which these output signals from the wheel detector units are received so that proper operation is achieved for either direction of travel.

In summary, the gating circuits which effect separate interrogation of the radiometer output signal to detect both overheated journal and dragging brake conditions are effective for either direction of travel. One gating circuit interrogates the radiometer output for a dragging brake condition as to each wheel throughout the time the center of that wheel lies between detector units WD2 and WD3, and a second gating circuit interrogates the radiometer output during the time the center of that same wheel lies between the detector units WD1 and WD2.

Where the two radiometer units for the two sides of a train are directly opposite each other as shown in FIG. 1, the gating circuits may be used in common for both and only one set of wheel detector units need be employed to control the gating circuits. It is, of course, within the scope of this invention that there be different sets of wheel detector units for the two different track rails, and where this is done they may be either placed directly opposite each other or not, as is desired. Where they are not opposite each other, different gating circuits may be used for the different radiometers, and these radiometers then also need not be placed directly opposite each other. The arrangement of FIG. 1 is ordinarily preferred, however, because of the simplicity and economy of apparatus which it entails. However, even where the arrangement of FIG. 1 is desired with the radiometer units directly opposite each other and with only one set of three wheel detector units being used, it should be recognized that it is not a requirement that all the wheel detector units be on the same rail; the gating circuits will operate in a satisfactory manner and in accordance with the description given whether they are on the same or on different rails.

The output of each radiometer is a low-level, unidirectional output voltage, and this must be substantially amplified in order to be of use. The common technique of D.C. amplification is employed in the present invention by providing a chopper and square wave generator such as the chopper 78 and square wave generator 79 illustrated in FIG. 5 as being associated with the radiometer RD1. The function of the chopper is to amplitude modulate the square wave of voltage of the square wave generator 79 according to the amplitude of the unidirectional output signal of the radiometer unit. The output of the square wave generator is a square wave of constant amplitude whose frequency is such that a substantial number of output cycles are included within the duration of each voltage variation provided by the radiometer. The result of this is that the A.C. amplifier 80 receives an input signal which is an alternating voltage at the frequency of the square wave generator 79, and this alternating signal is amplitude modulated in accordance with the amplitude of output of radiometer DR1. The amplifier 80 provides the required amplification of this signal and supplies its output to two gating circuits 82 and 83. As will subsequently be discussed in detail, gating circuit 82 receives a gating voltage only throughout the time that the radiometer RD1 is scanning the hub of each passing wheel, i.e. only while the center of each wheel lies between the wheel detector units WD1 and WD2. On the other hand, gating circuit 83 receives a gating voltage only throughout the time that the beam of scan of radiometer RD1 includes the wheel web and rim of each passing wheel, i.e. this gating voltage is applied only throughout the time each wheel center lies between the wheel detector units WD2 and WD3.

Each gating circuit 82 or 83 can transfer its input signal received from amplifier 80 to a respective diode detector circuit 87 or 88 only when it receives the required gating voltage. It follows, therefore, that the diode detector circuit 87 receives a signal representing the output of amplifier 80 during the brief interval that radiometer RD1 is scanning the hub of a passing wheel. This wheel hub signal is rectified and filtered by the diode detector circuit 87 so that an output signal is provided which corresponds to the output of radiometer RD1 throughout this gating interval and essentially differs therefrom only in that it is substantially amplified. This signal is applied to the hot journal detection circuit 93. If its amplitude is above some predetermined value so that the particular wheel hub causing it must have been at a dangerously elevated temperature, the hot journal detection circuit 93 will produce an output signal which is then applied to the inverter 99 and thence to the signal circuit 97 where it is effective to give a distinctive signal. The output signal of the diode detection circuit 87 is also applied directly to one of the analog pens included in the recorder of FIG. 7B and deflects this pen according to its amplitude. Because of this, the analog pen is deflected for each passing wheel by an amount representative of the infrared radiation emanating from its hub; an examination of the resulting trace provided by the pen indicates which of the journals, if any, are operating at unduly high temperatures.

In an analogous manner, the gating circuit 83 causes the output of amplifier 80 to be applied to the diode detector circuit 88 only when this gating circuit 83 receives a gating voltage from the FF2 flip-flop circuit 60, i.e. throughout the time that the center of each wheel lies between the wheel detector units WD2 and WD3. The diode detector circuit 88 rectifies and filters the resulting signal representing the level of radiation received from the wheel rim and supplies it as one input to the dragging brake detection circuit 94.

The dragging brake detection circuit 94 not only receives this latter signal representative of the temperature of the wheel rim, but also receives the output signal of the diode detection circuit 87 representing wheel hub temperature. Both these signals are stored for a brief interval in this dragging brake detection circuit 94 until an input signal is received from the clear circuit 105 at which time a comparison is made of their respective levels. If the stored signal representing wheel hub temperature is greater than the stored signal representing wheel rim temperature, this is an indication that the wheel rim is at an elevated temperature merely because of the conduction of heat to it from the wheel hub so that there is in fact no dragging brake condition. At such times, no output signal is applied to the No. 1 marker pen in the recorder. However, if at the time of comparison, the signal representing wheel rim temperature is greater than that representing wheel hub temperature, this is an indication that the wheel rim is at an elevated temperature because of dragging brakes and then an output signal is applied to the No. 1 marker pen to indicate this condition.

When the above comparison has been made and prior to the arrival of the next wheel, the clear circuit 105 acts to erase from the dragging brake detection circuit 94 the voltages stored therein as a result of the passage of the preceding wheel. This clearing out of the dragging brake detection circuit 94 results in its being able to store such voltages again for the next wheel.

The above description has been given with particular reference made to the manner in which the output of the radiometer RD1 is utilized to give detection of both dragging brakes and overheated journal. Analogous circuit means is shown which causes the output of the other radiometer RD2 to be acted upon in the same way so that different distinctive indications may be given when such conditions are detected on the other side of each passing train.

Figure 5:
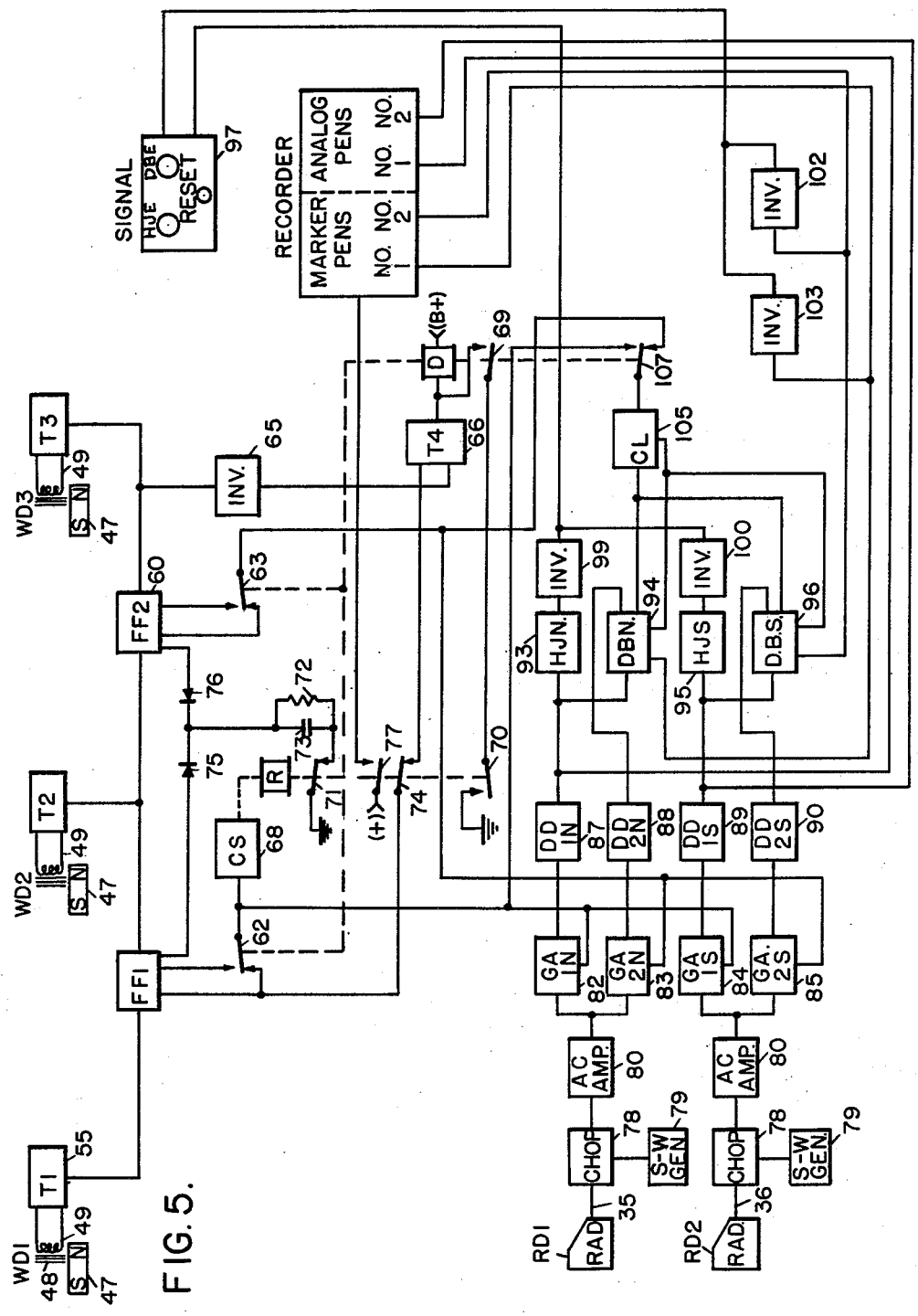
FIG. 5 is a block diagram of the system of this invention.

The gating voltages referred to above are derived from the two flip-flop circuits FF1 and FF2 shown in both FIG. 5 and FIGS. 7A and 7B. As shown in FIG. 5, these flip-flops are operated by the pulses obtained from the respective wheel detection units. A more detailed description of the mode of operation of these flip-flop circuits will be presented below; it is deemed sufficient for the present to recall, as previously described, that the flip-flop circuit FF1 supplies its gating voltage throughout the interval that each successive wheel has its center between the WD1 and WD2 detector locations and that the flip-flop FF2 similarly provides its gating voltage throughout the interval that each successive wheel has its center lying within the stretch of track between the two detector locations WD2 and WD3.

A relay R is also provided and is controlled by a control circuit 68 which receives its input from the flip-flop FF1. As a train passes the radiometer locations, the flip-flop FF1 is operated for each passing wheel to the condition wherein it provides the required gating voltage as already described. At all other times, when it is not providing this gating voltage it is in its opposite condition, and the result, therefore, is that this flip-flop FF1 operates alternately between opposite states, going through a complete cycle from one condition to the other and then back again for each passing wheel. This intermittent operation of the flip-flop FF1 effects a control through contact 62 of relay D onto the control circuit 68 causing it to pick this relay R up. This condition of relay R indicates that a train is present. When the train has passed, the flip-flop FF1 is no longer operated between alternate states, and the control circuit 68 senses this and then permits the relay R to be restored to its normal dropped-away condition.

One use that is made of relay R is to provide a resetting of the two flip-flops FF1 and FF2 after each train has passed. Thus, closure of back contact 71 suddenly grounds the lower terminal of capacitor 73 and this has the effect, as will subsequently be shown, of operating each of the flip-flops FF1 and FF2 to a normal condition.

Another use made of the operation of relay R involves the front contact 77 of this relay. When this front contact closes upon the arrival of a train at the radiometer location, electrical energy is applied through the contact to the recorder to set it into operation. With reference to FIG. 13, the recorder is illustrated as having transport means including a motor 129 and a drum 130 for feeding a tape 131 under a plurality of analog pens 134 and a plurality of marker pens 137.

An additional function of relay R resides in its control of relay D. This latter relay is, in effect, a direction sensing relay in that it is picked up for one direction of travel of a passing train but not for the other. The exact manner in which the contacts 70 and 74 of relay R effect the desired control of relay D will be more readily understood when the detailed circuits of FIGS. 7A–7D are described. As to the function of the latter relay D, its purpose is to cause the outputs of the two flip-flops FF1 and FF2 to be properly utilized in accordance with the direction of travel of each train as will also more easily be understood when the detailed circuits are described below.

Figure 6:
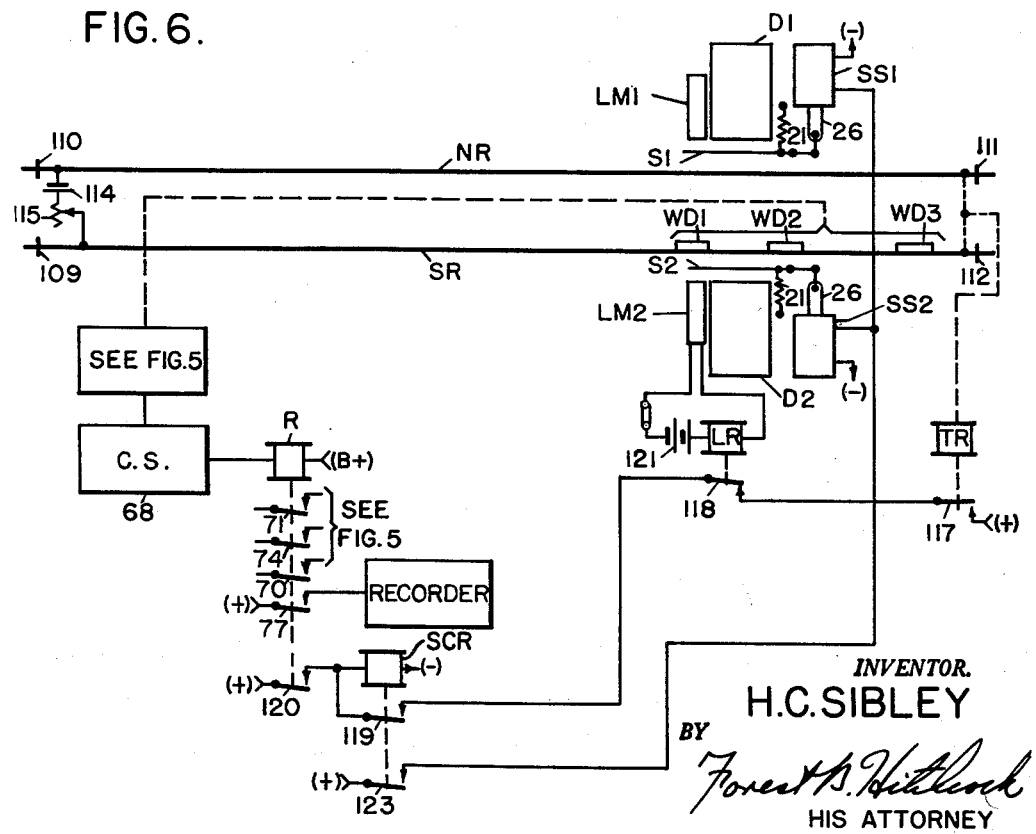
FIG. 6 illustrates a shutter control circuit for the shutters of the radiometers.

Still another function of relay R involves its control of relay SCR by means of which the shutters on the radiometers are actuated. This control is illustrated in FIG. 6 which shows a track circuit including the track rails SR and NR and defined by the insulated joints 109–112. The track circuit is energized by a battery 114 which supplies current to the track rails through limiting resistor 115. Track relay TR is connected across the track rails at the opposite end of the track section and is normally energized by the current flowing in the track rails but is dropped away whenever a train occupies the track section and shunts the track rails.

The shutter control relay SCR is energized by a pick-up circuit including front contact 120 of relay R so that relay SCR is picked up whenever relay R is energized upon the passage of a train. A stick circuit is provided to maintain the relay SCR picked when once picked up through a circuit which extends from (+) and includes back contact 117 of track relay TR, back contact 118 of the light relay LR, front contact 119 of relay SR, and through the winding of this relay SCR, to the (—) terminal. Relay LR is normally dropped away so that when relay R picks up upon the passage of a train and thereby picks up relay SCR as previously described, this stick circuit is completed through the back contact 117 of track relay TR which is then dropped away in response to the presence of a train in the track section. Ordinarily, it is not until the train has vacated the track section so that track relay TR can be restored to its normal picked-up condition that energy is removed from the winding of relay SCR. However, under certain conditions a high level of radiation, as from the sun, may fall upon the interior of the radiometer in the interval after the train has passed but before the track relay picks up. If this happens, the light meter element such as LM2 provides a reduced resistance in series with battery 121 so that relay LR picks up, and opens back contact 118 so that relay SCR is de-energized. From this description, it can be seen that front contact 123 of relay SCR is operated to a closed condition to thereby energize solenoids SS1 and SS2 only upon the passage of the first wheels of the passing train which effects the picking up of relay R, and this energization of the solenoids is maintained until the track section becomes again unoccupied, so that relay TR is again picked up, except that when a high level of radiation impinges upon the detecting elementts as from direct sunlight, then relay SCR is released immediately after the passage of the train so that its front contact 123 will open and thereby deenergize the solenoids and permit the shutter to be restored to its normal protective position.

In describing the general mode of operation of the flip-flops FF1 and FF2, reference will be made not only to the block diagram of FIG. 5, but also to the detailed circuits of FIGS. 7A–7D, particularly FIGS. 7A and 7B.

The two flip-flop circuits FF1 and FF2 respectively provide the two gating voltages previously mentioned, the gating voltage provided by flip-flop FF1 existing throughout the time that the center of each wheel lies between the wheel detectors WD1 and WD2, when the radiometer is scanning the associated wheel hub, and the flip-flop FF2 providing its gating voltage throughout the time each wheel center lies between wheel detectors WD2 and WD3 at which time the associated radiometer is scanning the wheel rim of the associated wheel. These flip-flop circuits are operated by the respective wheel detection circuits. Thus, as each wheel flange passes into and then out of an inductive coupling relationship with the permanent magnet 47 associated with a particular wheel detector, a voltage pulse is generated which causes the associated thyratron such as thyratron T1 in the wheel detector circuit 55 to fire and provide a negative-going plate voltage pulse to the associated flip-flop circuit. The output of the thyratron T1 associated with wheel detector WD1 is provided as an input only to the flip-flop FF1, and the thyratron T3 similarly associated with wheel detector WD3 supplies its output pulse only to the flip-flop FF2. On the other hand, the thyratron T2 associated with wheel detector WD2 provides its output pulse to both the flip-flops FF1 and FF2.

For a train traveling from left to right and causing output pulses to be provided in succession by the thyratrons T1, T2 and T3, in that order, each output pulse from thyratron T1 operates flip-flop FF1 to the condition where it will provide the desired wheel hub gating voltage over wire 292 to the gating circuits 82 and 84. The output pulse from thyratron T2 which is applied to flip-flop FF1 operates this flip-flop FF1 to the opposite condition where it no longer provides this gating voltage. At the same time, this output pulse from thyratron T2 operates flip-flop FF2 to the condition where it will provide the desired wheel rim gating voltage over wire 229 to both the other remaining gates 83 and 85. The end of this latter gating voltage is demarcated by the occurrence of the output pulse from thyratron T3 which operates flip-flop FF2 to the condition where this gating voltage is removed. These gating voltages obtained from the flip flops FF1 and FF2 respectively are applied to the wires 292 and 229 through back contacts 62 and 63 of direction sensing relay D respectively, which relay is dropped away for this particular direction of travel as will subsequently be described.

For the opposite direction of travel, each successive wheel causes an output pulse to be produced first by thyratron T3, and this pulse operates flip-flop FF2 to the condition where it will provide the required wheel rim gating voltage. (It will later be described that for the very first wheel of the train, the operation of the flip-flops differs somewhat from that described here, but such preconditioning action is of no effect after the first wheel has passed and so will not be further considered at this time.) The termination of this gating voltage is brought about by the subsequent operation of flip-flop FF2 when the next-occurring output pulse is derived from the plate of thyratron T2. The detailed description that follows these particular circuits will make it evident that the actual condition of flip-flop FF2 during the time that each wheel center lies between the wheel detectors WD2 and WD3 is entirely dependent upon the direction of travel of that wheel. More specifically, for the left to right direction of travel, the flip-flop FF2 will be in the condition where its tube A is conductive throughout the time that the wheel center lies between detector WD2 and WD3, but the opposite conditions prevail, i.e. tube B is conductive for a train traveling from right to left throughout the time that each wheel center lies between wheel detectors WD2 and WD3. In either case, however, the flip-flop circuit provides the desired gating voltage, and it is for this reason that the contact 63 of relay D must be provided. More specifically, this contact of the direction sensing relay permits the connection of wire 229 to the cathode of tube A whenever the direction of travel of the train is from left to right, but instead connects this wire through front contact 63 to the cathode of tube B for the opposite direction of travel. In this manner, even though the flip-flop FF2 is in different states, one the opposite of the other, during the time that it is to provide its output gating voltage, dependent upon the direction of travel of the train, the directional relay D ensures that the desired gating voltage will nevertheless be obtained from the flip-flop.

The above description given with respect to flip-flop FF2 applies as well to flip-flop FF1 in the sense that this flip-flop FF1 is in the exact opposite state when it is to be effective to supply the hub gating voltage for a train traveling from right to left as compared to the previously described condition wherein the train was traveling from left to right. Here again, however, the contact 62 of relay D properly connects the wire 292 to either the cathode of tube A or to the cathode of tube B in accordance with such direction of travel so that the desired gating voltage may be applied to gates 82 and 94 regardless of the direction of travel.

DESCRIPTION OF DETAILED CIRCUITS

Amplifier and gating circuits: FIGS. 8A–8B

FIGS. 8A and 8B when placed with FIG. 8B to the right of FIG. 8A illustrate the manner in which the unidirectional output signal of the radiometer is amplified by means of a chopper, square wave generator, A.C. amplifier and gated detection circuits. The circuits shown are those which are associated with a single one of the radiometer units; similar circuits are, of course, provided for the other radiometer unit but will not be described in detail.

The square wave generator 79 may be of any conventional type and may employ two transistors Q4 and Q5 as illustrated in FIG. 8A. Essentially the square wave generator is a self-running oscillator wherein the two transistors are alternately and oppositely operated between their cut-off and conductive conditions so that a square wave of voltage appears in the primary winding of transformer TR2 included in the chopper 78. This square wave of voltage alternately renders the two transistors Q6 and Q7 increasingly conductive and since the collector of transistor Q6 is further influenced by the level of the radiometer signal applied to it through capacitor 167, the over-all result is that there is applied, through capacitor 168, and impressed upon resistor 169, an alternating voltage having a frequency corresponding to the frequency of operation of the square wave generator, but with its amplitude varying in correspondence with the amplitude of the unidirectional output provided by the radiometer unit.

This A.C. voltage appearing across resistor 169 is amplified by the transistor amplifiers stages comprising transistors Q8, Q9, Q10 and Q11 all included in block 80 of FIG. 8A. The result is that there appears between the collector of transistor Q11 and ground an A.C. voltage which is an amplified version of that appearing across the previously mentioned resistor 169. This A.C. voltage is applied to the primary winding of transformer TR3 and induces a corresponding A.C. voltage in the secondary windings of this transformer.

The separate secondary windings of transformer TR3 are each included with the respective transformers TR4 and TR5 in the gating circuits 84 and 85 respectively. In the description that follows, reference will be made particularly to the gating circuit 84, and this description will be equally applicable to the other gating circuit 85 which is identical thereto.

The gating voltage that is applied to the center tap of the primary winding of transformer TR4 is obtained from the flip-flop FF1 and is derived, as described above, from a cathode resistor. When this tube is nonconductive, zero voltage is applied to the primary of transformer TR4. Since a positive voltage is at all times obtained from the junction of resistors 201 and 202 and applied to the center-tap of the secondary winding of transformer TR3, the left-hand terminal each of the rectifiers 197 and 198 is at a more positive potential than its right-hand terminal so that each of these rectifiers is blocked and no conduction can take place through them. Therefore, none of the A.C. voltage appearing across the secondary winding of transformer TR3 can be applied to the primary winding of transformer TR4. However, when the electron tube A included in the flip-flop FF1 becomes conductive so that the voltage across the cathode resistor is raised above ground, the potential at the right-hand terminal of both rectifiers 197 and 198 may equal or exceed that applied to the left-hand terminals thereof so that both these rectifiers can alternately conduct on opposite half-cycles of the A.C. voltage appearing across the secondary winding of transformer TR3, the return path in each case being through the grounded terminal of such cathode resistor and there through resistor 202 back to the TR3 secondary winding. When this happens, a corresponding A.C. voltage is induced in the secondary winding of transformer TR4.

The diode detection circuit 89 is of the conventional voltage doubling type with the result that there appears across resistor 207 a voltage which represents the rectified and filtered output of the amplifier during the time that the gating voltage is derived from the flip-flop FF1. This unidirectional voltage appearing across resistor 207 corresponds with the unidirectional output voltage originally derived from the radiometer during that gating interval and differs therefrom essentially only in that it is of greater amplitude. This voltage is applied directly to a recorder to give a graphical indication of the temperature of the passing wheel hub and is also applied to both the hot journal detection circuit 95 and the dragging brake detection circuit 96 in the manner previously described when relating the general operation of the circuits. This portion of the description will be considered in greater detail subsequently when the circuits of FIGS. 7A—7D are considered.

Wheel detector circuits

Each wheel detector includes a permanent magnet 47 which is affixed to the track rail in such a manner that the flange on each passing wheel moves into and subsequently out of an inductive coupling relationship with the magnetic field established by the permanent magnet. As a result of the flux change that occurs, a voltage is induced in the associated winding 49 having a wave shape generally as shown in FIG. 9A which illustrates a voltage of generally sine-wave form. This voltage is applied through a capacitor 128 to a resistor 130 which is connected in the base emitter circuit of transistor Q1. Substantially the entire variation of voltage from its positive to its negative peak is effective when applied through capacitor 128 to vary the base-emitter voltage so that transistor Q1 is rendered conductive to generate thereby a positive-going voltage variation which appears across resistor 133. When this voltage across resistor 133 is of sufficient amplitude to overcome the negative bias that is normally applied to the grid of tube T1 from (—) through resistors 133 and 135, the tube T1 is fired.

The amplitude of the voltage variation appearing across winding 49 is dependent on the speed of the passing wheel. However, by using the variation from positive to negative peak of this voltage to fire the thyratron T1, this tube will fire repeatedly at substantially the same relative position of a wheel with respect to the wheel detector. More specifically, if only a few volts variation in the signal is generated in winding 49 is necessary in order to fire tube T1, it can be seen from FIG. 9A that, even though the peak-to-peak variation of voltage across this winding may vary considerably, its steepness as it varies from the positive to the negative peak ensures that the few voltages of variation needed to fire tube T1 will generally always occur at about the same relative position of the wheel to the wheel detector. As a result, the gating voltages that are demarcated as a result of the outputs provided by the thyratrons T1, T2 and T3 are substantially independent of the speed of each passing wheel.

Since each thyratron tube such as tube T1 is normally non-conductive, its plate voltage is at substantially the level of (B+) voltage supply, and the capacitor 144 connected from the plate to ground is similarly charged to this high voltage. Upon the firing of thyratron T1, capacitor 144 abruptly discharges through the low resistance plate-cathode circuit of the conducting tube and sufficiently reduces the plate voltage of this tube for a long enough interval that the tube is rendered nonconductive within a very brief interval. The result of this is that the firing of tube T1 produces a negative-going voltage pulse at the plate thereof and this pulse is of quite short duration since tube T1 is quickly extinguished so that its plate voltage rises to the normal high level.

Flip-flops FF1 and FF2

Each of the flip-flops FF1 and FF2 is in the state wherein its tube B is conductive when no train is present. A resetting circuit including back contact 71 of relay R ensures that both these flip-flops will be operated to such condition upon the passage of a train. The manner in which this resetting circuit operates will subsequently be described in detail.

Each of the two flip-flops comprises a bistable state circuit organization frequently also known as an Eccles-Jordan trigger circuit. Each flip-flip comprises two interconnected electron tubes, their interconnection being such that one and only one of these tubes can be conductive at any time, the other tube then being fully cut-off.

The operation of flip-flop circuits of this kind is well known in the art so that it is deemed unnecessary to describe them in any great detail here. Briefly, however, the normal conductive state of tube B causes it to have a very low plate voltage as a result of the large voltage drop across plate resistor 148 so that a low, cut-off voltage appears at the grid of tube A and holds this tube in a nonconductive condition. At the same time, the nonconductive condition of tube A causes it to have a high plate voltage because of the low voltage drop across plate resistor 142, and this supplies a voltage to the grid of tube B sufficiently high to maintain this tube in a fully conductive state.

An application of a negative-going voltage pulse from the plate of thyratron T1, through capacitor 138 and resistor 141 to the control grid of tube B initiates an instantaneous switching action resulting in a complete reversal of the relative conductive states of the two tubes A and B. Thus, such negative-going pulse causes tube B to become momentarily nonconductive so that an abrupt increase in its plate voltage results. This voltage increase produces an increase of grid voltage of tube A so that this tube becomes conductive. The result of this is a decrease in plate voltage of tube A, thereby resulting in a further decrease in grid voltage of tube B. The switching action thus initiated by a negative-going pulse to the grid of tube B becomes cumulative in nature so that the reversal of states occurs almost instantaneously.

Once the flip-flop is in the condition where tube A is conductive, it stays in this state until a similar negative-going trigger pulse is applied from the plate of thyratron T2 and through capacitor 227 to the grid of tube A which immediately switches the flip-flop back to the condition where tube B is conductive and tube A is cut off. Flip-flop FF2 operates similarly, being operated to the condition where tube A is conductive by a trigger pulse applied through capacitor 138 to the grid of tube B from the plate of thyratron T2. This flip-flop is likewise restored to the normal condition wherein tube B is conductive by a negative-going trigger pulse obtained from the plate of tube T3 and applied through capacitor 227 to the grid of tube A.

For each successive wheel of the train passing from left to right so that outputs are derived successively from the thyratrons T1, T2 and T3, the flip-flop FF1 is operated to the state where tube A is conductive only during the interval following the occurrence of the output pulse from the thyratron T1 and until the occurrence of the output pulse from thyratron T2. Flip-flop FF2, on the other hand, is operated to the state wherein its tube A is conductive only throughout the interval starting with the occurrence of the output pulse from the thyratron T2 and terminating with the occurrence of the output pulse from thyratron T3.

Both flip-flops FF1 and FF2 when in their normal condition with tube A nonconductive can provide no output voltage across the cathode resistors 150 of their respective A tubes. Both wires 292 and 229 which respectively carry the hub gating and rim gating voltages from flip-flops FF1 and FF2 are, for this direction of travel of the train (i.e. left to right), connected through back contacts 62 and 63 of relay D to the cathodes of the A tubes of both flip-flops so that normally no gating voltage appears on either of these wires. However, whenever flip-flop FF1 has its tube A conductive as when a wheel lies between wheel detector units WD1 and WD2, the plate current of tube A produces a voltage drop across cathode resistor 150 which is applied through back contact 62 of relay D to wire 292. Similarly, whenever flip-flop FF2 is in the condition where its tube A is conductive, as when a wheel lies between wheel detector units WD2 and WD3, a voltage drop is produced across cathode resistor 150 which is applied through back contact 63 of relay D to wire 229.

For the opposite direction of travel of a train, the first output from a wheel detector unit is obtained from wheel detector WD3, and this output is applied through capacitor 227 to the control grid of tube A of flip-flop FF2. This first output, which will ordinarily occur in response to the passage of the first wheel of the locomotive, can have no effect upon flip-flop FF2 since the only effect of such pulse can be to operate the flip-flop to the condition where tube A is nonconductive and this is the already existing condition of flip-flop FF2 upon the occurrence of such output pulse from thyratron T3. Shortly thereafter, this same wheel produces an output from thyratron T2 and this is applied to capacitor 138 to the grid of tube B of flip-flop FF2. This trigger pulse now operates flip-flop FF2 to its opposite condition wherein tube B is cut off and tube A is conductive. The same trigger pulse derived from thyratron T2 is also applied through capacitor 227 to the control grid of tube A of flip-flop FF1. Here again, this pulse can have no effect upon this flip-flop because it is already in the condition wherein tube A is non-conductive and tube B conductive. Subsequently, when this same wheel produces an output pulse from thyratron T1, this output pulse will act upon tube B and reverse the state of flip-flop FF1, leaving it in the condition where tube B is nonconductive and tube A conductive. Thus, after a first wheel of such train passing from right to left has produced outputs from all three wheel detectors in succession, WD3, WD2 and WD1, both flip-flops FF1 and FF2 are left in the condition wherein tube B is nonconductive and tube A is conductive.

For the train passing from right to left, the following description relates what occurs not only for the second wheel of such train, but also for all the following wheels. The trigger pulse obtained from thyratron T3 in response to any wheel produces a negative trigger pulse at the grid of tube A of flip-flop FF2 and therefore can operate this flip-flop to the opposite state wherein tube A is nonconductive. The next occurring output pulse from thyratron T2 operates the flip-flop back again to the condition wherein tube A is conductive and tube B cut off. This same trigger pulse from thyratron T2 acts upon flip-flop FF1 by reversing the conductive states of tubes A and B, leaving tube A cut off. Finally, the last output pulse obtained from thyratron T1 occurs and this is applied to tube B of flip-flop FF1 thereby restoring this flip-flop to the condition wherein its tube A is conductive and tube B cut off.

It follows from the description just given with respect to a train moving from left to right, that it is the B tube of each flip-flop that is conductive throughout the interval that particular flip-flop is to supply its gating voltage. Contrarily, for the description previously given with respect to the opposite direction of travel, it was evident that it was the A tube of each flip-flop that was conductive when the particular flip-flop was to supply its gating voltage. It is for this reason that the direction sensing relay D is provided for it makes the required selection to permit the required gating voltage to be obtained from flip-flops FF1 and FF2 irrespective of the direction of train movement. For trains moving from left to right, relay D is dropped away so that wires 292 and 229 are respectively connected to the A tubes of flip-flops FF1 and FF2 since it is these tubes that will be conductive throughout the respective gating interval. However, for a train moving in the opposite direction, relay D is picked up and wires 292 and 229 are then connected to the B tubes of the respective flip-flops since it is these tubes that will supply the gating voltage under these conditions.

*Direction sensing relay D*

Relay D is controlled by thyratron T4 in control circuit 66 which receives its grid input signal from the plate of tube 278 included in inverter 65 and controlled by the output pulse obtained from the plate of thyratron T3. Each time that tube T3 is fired, the negative-going plate voltage pulse it supplies is fed through capacitor 277 to the control grid of tube 278. Capacitor 277 and resistor 280 form a differentiating circuit associated with the grid of tube 278. Normally tube 278 is fully conductive since its grid is connected through resistor 280 to the (B+) terminal. However, each negative-going voltage pulse applied through capacitor 277 to the control grid causes this tube to become nonconductive for an interval determined by the time constant of the charging circuit for capacitor 277 through the high value of resistance provided by resistor 280. Throughout the time tube 278 is held below cut-off by such negative-going trigger pulse, its normally low plate voltage is substantially increased. The result, therefore, is that each trigger pulse from thyratron T3 produces a positive-going output pulse at the plate of tube 278. This pulse is applied through rectifier 283 and through capacitor 284 to the control grid of thyratron T4.

The positive-going pulse that results at the grid of tube T4 is sufficient to overcome the negative bias voltage normally supplied by the connection of the grid through resistor 286 to the (—) terminal. Although the grid is thus driven into the region required to fire tube T4, this tube will fire only provided its shield grid is concurrently provided with a positive gating voltage from the plate of tube A of flip-flop FF1 of sufficient amplitude to overcome the negative voltage normally applied thereto from (—) through resistor 282. This gating voltage will only be received whenever flip-flop FF1 is in the condition where tube A is non-conductive since only then will there be a very low voltage drop across plate resistor 142. Moreover, these conditions, i.e., a pulse from thyratron T3 while flip-flop FF1 has its A tube cut off, must be met at the time of passage of the first wheel of any train since, as will presently be described, relay R is picked up immediately after the first wheel has passed so that back contact 74 thereof is opened thereby depriving the shield grid of thyratron T4 of the required gating voltage from flip-flop FF1. Thus, for a train passing from left to right, relay R will have been picked up by the time the first wheel has produced an output pulse from thyratron T3. The shield grid of thyratron T4 can, therefore, not receive the shield grid gating voltage at the time of occurrence of the trigger pulse from thyratron T3 because of open back contact 74 and will not be fired under these circumstances. However, for the opposite direction of train movement, an output pulse is obtained from thyratron T3 by the first wheel of such train at a time when flip-flop FF1 is in its normal condition with tube B conductive and tube A nonconductive. The mere occurrence of an output pulse from thyratron T3 has no effect upon the operation of relay R as will subsequently appear nor does it effect any operation of flip-flop FF1 so that the required shield grid gating voltage will be applied through back contact 74 of relay R to the shield grid of thyratron T4 at the time of occurrence of the trigger pulse from thyratron T3. Tube T4 will be fired thereby and the resulting flow of anode current through the winding of relay D will pick this relay up. When this occurs, the front contact 69 thereof will close and connect the left-hand terminal of the relay through such closed contact and then through front contact 70 of relay R to ground. The result is that relay D will remain energized as long as relay R remains picked up. At the same time, the grounding of the left-hand terminal of relay D extinguishes tube T4 so that it is restored to its normal condition.

Relay R

Relay R is picked up in response to the first operation of flip-flop FF1 from one condition to the other and this relay remains picked up as long as flip-flop FF1 is alternately operated between its opposite stable conditions by the successive passing wheels of a train. For a train passing from left to right, the first output pulse obtained from thyratron T1 causes tube A of flip-flop FF1 to become conductive, and the resulting increase of potential across cathode resistor 150 is applied through back contact 62 of relay D to charge capacitor 153 in the grid circuit of tube 152. This latter tube is operated as a cathode follower and is normally conductive since its grid is connected through grid resistor 154 to ground. In its normally conductive condition, tube 152 has its cathode above the level of the (B—) voltage supply in accordance with the voltage drop produced by the flow of cathode current through resistor 156. However, under these normal conditions, the voltage applied to the grid of tube 158 and appearing across capacitor 159 is not sufficiently high with respect to the grounded cathode of tube 159 that this latter tube will conduct sufficient current to pick up relay R included in its plate circuit.

However, the charging of capacitor 153 that occurs in response to the cathode voltage increase of flip-flop FF1 produces a substantial increase in cathode voltage of tube 152, thereby quickly charging capacitor 159 through the low impedance plate-cathode circuit of tube 152 and increasing the grid potential of tube 158 sufficiently so that its plate-cathode current increases to a value sufficient to pick up relay R. As flip-flop FF1 alternately operates between its opposite stable states, capacitor 153 is alternately charged and discharged, but the average level of voltage across it and thus the average level of cathode current of tube 152 is sufficiently increased that the charge across capacitor 159 and thus also the grid voltage of tube 158 are elevated sufficiently above normal that relay R remains picked up.

Even though the switching of flip-flop FF1 alternately back and forth should occur at a slow rate, as when a train is moving slowly along the track, relay R will remain picked up because the increased charge on capacitor 159 can discharge only slowly between successive charges through resistor 156. Thus, even under such circumstances, the grid of tube 158 will remain at or above the level required to hold relay R in a picked up condition.

When the train has passed so that the flip-flop FF1 is no longer operated between its opposite conditions, the increased charge on capacitor 159 is discharged through resistor 156 so that relay R drops away. When this happens, the back contact 71 of this relay is closed thereby connecting the lower terminals of capacitor 73 and resistor 72 to ground. This has the effect of providing a low impedance path from the plates of the B tubes of both flip-flops FF1 and FF2 through the respective diodes 75 and 76 to ground and this condition persists for the length of time required for capacitor 73 to charge to the level of voltage ordinarily existing at the plates of these tubes. The effect, however, is equivalent to applying a negative-going voltage pulse to the plates of both tubes and from there to the grids of both A tubes. The over-all effect is to ensure that both flip-flops are restored upon the passage of a train to the normal condition wherein both B tubes are conductive and both A tubes are cut off.

Hot journal detection circuits

As previously mentioned, the outputs of the diode detector units 87 and 89 represent the outputs of the respective radiometers RD1 and RD2 during the intervals they are scanning the successive wheel hubs, and the similar diode detector units 88 and 90 represent the outputs of the respective radiometers RD1 and RD2 during the intervals they are scanning the rim of each passing wheel. The output signals provided by the detector units 87 and 89 are supplied directly to respective analog pens Nos. 1 and 2 included in the recorder of FIG. 7B. For example, the output of the diode detector unit 89 is thus applied over wire 225 to the analog pen No. 2 of the recorder.

In addition, the output signals provided by the diode detector units 87 and 89 are applied to hot journal detection circuits 93 and 95 respectively. The output signal provided by the diode detector unit 89, for example, is applied through a capacitor 214 directly to the grid of thyratron T8. Normally the grid of this tube is held sufficiently negative with respect to the grounded cathode by being connected through resistor 215 to a tap on potentiometer 216 connected between (B+) and (B—) to hold tube in a nonconductive state. This bias voltage is sufficiently negative, moreover, that the tube will not be fired by an output signal from the diode detector unit 89 having an amplitude sufficiently low to indicate that the wheel hub then being scanned is at about the normal expected operating temperature. However, in the event of an overheated journal so that the output signal derived from scanning the associated hub is at a high level, this will drive the grid of thyratron T8 sufficiently positive so that this tube will fire. The capacitor 296 connected between the plate of thyratron T8 and ground has the function described above in connection with the operation of thyratron T2 in that it quickly restores tube T8 to a nonconductive state. The result, therefore, is that tube T8 is rendered conductive for only a brief interval so that a negative-going voltage variation appears at its plate.

This negative-going pulse is applied through a capacitor 295 to the grid of triode tube 294 included in the inverter 100. This inverter operates in a manner exactly like that of the inverter 65 previously described so that a positive-going voltage pulse appears at the plate of tube 294 in response to each negative-going voltage pulse appearing at the plate of tube T8.

A similar circuit organization is associated with diode detector 87 and any output pulses obtained from the tubes 294 included in either of the inverters 99 and 100 are supplied over a common connection and through capacitor 302 to the control grid of thyratron T10. This thyratron is also maintained normally nonductive by the bias voltage supplied by the connection of its grid through resistor 307 to the (B—) terminal. However, the positive-going pulses obtained from either of the tubes 294 included in the inverters 99 and 100 are effective to overcome this bias and thereby fire the thyratron T10. When this occurs, there is a flow of plate current of thyratron T10 through the winding of relay JR and through the normally closed contact of the reset push button RS to the (B+) terminal. Relay JR is picked up as a result and closes its front contact 309 so that energy can then be applied from the (+) terminal and through this contact to light the hot journal indicating lamp HJE. Once such an indication is given by the illumination of this lamp, it remains illuminated since the thyratron T10 when once rendered conductive will remain in that state. The indication is removed only when the push button RS is actuated to thereby open the plate circuit of thyratron T10 and drop away relay JR thereby opening front contact 309 and extinguishing lamp HJE.

*Dragging brake detection circuits*

The outputs of the diode detector units 87 and 89 are also applied to the dragging brake detector circuits 94 and 96, respectively, to permit a comparison of the amplitude of each such signal with the amplitude of the wheel rim signal obtained from the same wheel as previously described in connection with the general description of this invention. Thus, considering the output of the diode detector unit 89, this is shown as being applied through a rectifier 221 to capacitor 222 included in the dragging brake detector circuit 96. The rectifier 221 prevents the discharge of capacitor 222 as the signal from diode unit 89 decreases in amplitude below its peak value. The result is that capacitor 222 becomes charged to the peak amplitude of the output of diode detector unit 89. In an analogous manner, capacitor 223 also included in the dragging brake detection circuit 96 is charged to the peak amplitude of the output signal provided by the diode detection unit 90. The result is, therefore, that for each passing wheel, the capacitors 222 and 223 are charged respectively to the peak amplitudes of the signals representing hub and brake temperatures.

After this has happened and before the arrival of the next wheel, a signal is obtained from the clear circuit 105 and applied over wire 260 to both the dragging brake detection circuits 94 and 96. At the time this signal is applied, if and only if the charge then stored in capacitor 223 is greater than that stored in 222 by a predetermined amount, there is a voltage induced in the secondary winding of transformer TR6 of sufficient amplitude and of the proper polarity that the bias normally present on the grid of thyratron T9 will be overcome and this tube is fired so that a negative-going voltage pulse will be obtained at its plate. The signal that results will be applied directly to a respective one of the marker pens in the recorder of FIG. 7B and will also be applied through a respective one of the inverters 102 and 103 so that the thyratron T11 in the signal circuit 97 of FIG. 7B will be fired to thereby pick up relay BR and thus provide a visual indication of the dragging brake condition.

Considering the operation of this circuit in somewhat greater detail, the charges placed on these two capacitors in the manner previously described are readily maintained thereon at this time since the control grids of both halves of the dual triode tube 219 are biased below cut off by their being connected through resistor 272 to the (—) source of voltage and no positive voltage is present at this time on wire 270 from the clear circuit 105 to overcome this negative bias as will subsequently be more fully described.

The upper terminals of the two capacitors 222 and 223 are connected through respective diodes 262 and 263 to the opposite terminals of the primary winding of transformer TR6. The grid of thyratron T9 is connected through resistor 310 and the secondary winding of this transformer TR6 to the (—) source of voltage and the voltage thus supplied to the grid is sufficiently negative with respect to the grounded cathode that this tube is prevented from becoming conductive. However, in response to a current change in the primary winding of transformer TR6 in the proper direction and of sufficient amplitude, a voltage pulse of sufficient amplitude and proper polarity is induced in the secondary winding of this transformer to overcome this negative bias so that thyratron T9 will be fired. The opportunity to generate such a voltage pulse in the grid circuit of thyratron T9 comes at a time after both the hub and brake signals from the radiometers are stored in the respective capacitors 222 and 223 at which time a positive voltage appears on wire 260 as will subsequently be described when the operation of the clear circuit 105 is explained.

At the time this positive voltage appears on wire 260, both capacitors 222 and 223 receive additional charging current through the respective resistors 257 and 258 and corresponding diodes 262 and 263. If the initial charge on the two capacitors 222 and 223 has been substantially equal, both capacitors charge substantially equally through these two resistors and there is then no flow of current through the primary winding of transformer TR6 and no voltage is induced in the secondary thereof to cause tube T9 to fire. However, if the initial charge on capacitor 223 was greater than that on capacitor 222, capacitor 223 will be fully charged much more quickly than capacitor 222, and charging current for capacitor 222 will be supplied not only through resistor 257, but also through resistor 258 and through the primary winding of transformer TR6. This pulse of charging current for capacitor 222 through the primary winding of transformer TR6 is of the proper polarity that the resulting voltage induced in the secondary winding will produce a positive-going trigger pulse on the grid of thyratron T9. If the difference in the initial charges on the capacitors 222 and 223 is above some predetermined amount indicating a corresponding predetermined difference in temperatures of wheel rim and hub, then the current pulse through the primary winding of transformer TR6 will be of sufficient amplitude that the induced secondary pulse will cause thyratron T9 to fire. Upon being thus fired, thyratron T9 will be quickly extinguished as a result of capacitor 316 connected from its plate to ground. However, the momentary conduction of this tube produces a negative-going voltage pulse at its plate which is then applied over wire 312 to the marker pen No. 2 of the recorder of FIG. 7B, thereby causing this pen to be deflected and indicate thereby that a dragging brake condition has been detected. The output of the other dragging brake detection circuit 94 is similarly taken from the plate of the corresponding thyratron T7 and applied over wire 261 to the No. 1 marker pen included in the recorder of FIG. 7B.

Since the proper polarity of pulse must be induced in the secondary winding of transformer TR6 to cause thyratron T9 to fire, this tube will not fire when the stored charge on capacitor 223 is less than that on capacitor 222. In that case, the flow of current through the primary winding when the voltage on wire 260 goes positive will be opposite to that described above so that the grid of T9 will receive a negative rather than a positive pulse.

RECORDER

From the description previously given, it is apparent that each analog pen in the recorder is deflected for each passing wheel, being deflected only a small amount when the wheel hub is at normal temperature and a low level of wheel hub signal is given by the corresponding radiometer and producing a substantially larger deflection of that pen when a journal is overheated so that the wheel hub output signal of the radiometer is substantially increased in amplitude. Since a mark is made on the graph of the recorder for each passing wheel, it is apparent that, when an indication is given of an overheated hub condition, it can readily be ascertained which journal on the train is overheated. Thus, the particular pen producing the deflection indicative of an overheated journal indicates on which side of the train the overheated journal occurs, and since a deflection of some kind is recorded for each passing wheel, a count of the total number of deflections immediately indicates which particular journal on that side of the train is overheated.

Each marker pen, however, gives a deflection on the graph of the recorder only when a dragging brake condition is detected, but since this record is ordinarily made upon the same graph as the marks made by the analog pens, it is again an easy matter to detect not only on which side of the train the dragging brake condition exists, but also which axle, the latter information again being obtained by counting the number of deflections produced by the associated analog pen.

Signal circuit 97

The output pulses provided by thyratrons T7 and T9 of the two dragging brake detection circuits 94 and 96 are supplied to the inverter circuits 103 and 102 respectively. The outputs obtained from the plates of the tubes 313 included therein are connected in parallel over a single wire 323 to the signal circuit 97 of FIG. 7B. Each of the inverters 102 and 103 comprises an amplifier tube with a differentiating network in its grid circuit and operates in a manner corresponding to the inverter 65 of FIG. 7B previously described. Thus, upon the occurrence of the negative-going voltage pulse at the plate of thyratron T7, a positive-going trigger pulse appears at the plate of tube 313 of inverter 103. A similar positive-going voltage pulse appears at the plate of tube 313 of inverter 102 for each negative-going voltage variation at the plate of thyratron T9. These voltage variations at the plate of either of the tubes 313 are applied over wire 323 to the grid of thyratron T11 via the coupling capacitor 321. This positive-going pulse is of sufficient amplitude to overcome the negative bias applied to the grid through resistor 325 from the (−) terminal. Thus, such positive-going pulse fires thyratron T11 and picks up relay BR included in its plate circuit. When once fired, thyratron T11 remains fired until the reset push button RS is actuated to thereby open the plate circuit. Throughout the time that thyratron T11 remains conductive, relay BR remains picked up so that a circuit is maintained from (+) and through front contact 327 of relay BR to energize the dragging brake signal indication lamp DBE.

Clear circuit 105

As has been described, the clear circuit 105 of FIG. 7D has the function of providing a positive voltage on wire 260 just subsequent to the time that the signals indicative, respectively, of hub and rim temperatures of each wheel have been stored in the respective capacitors 222 and 223. The clear circuit 105 has another function which is to provide a positive voltage at some later time on wire 270 to the grids of tube 219 included in either of the dragging brake detection circuits 94 and 96, and the function of this positive voltage on wire 270 is to clear out the voltages then stored in capacitors 222 and 223 so as to render them susceptible to a subsequent charging when the next successive wheel is to be scanned by the corresponding radiometer. The manner in which the clear circuit 105 provides these functions will now be described in detail.

The clear circuit 105 includes a multivibrator comprising tubes A and B. These tubes are interconnected between their respective plate and grid circuits such that they function as a one-shot multivibrator which is triggered into operation by each successive negative-going voltage variation appearing on wire 230 and applied through capacitor 247 to the plate grid of tube A. Normally tube B of the multivibrator is conductive since its grid is connected directly to the (B+) source of voltage through resistor 255. With tube B normally conductive, its plate voltage is at a low level. When a negative-going voltage variation appears on wire 230, however, there is a discharging of both capacitors 247 and 248 so that the grid of tube B which is normally at about the potential of the grounded cathode is driven negative, below cut off. This results in an abrupt increase in the plate potential of this tube which is applied over wire 260 to both of the dragging brake detection circuits 94 and 96 as previously described to effect the comparison of the voltage stored in capacitors 222 and 223. At the same time, the high voltage at the plate of tube B causes an increase in the grid voltage of tube A so that this tube is rendered fully conductive under these circumstances. However, after a predetermined interval as measured by the time constant for the discharge of capacitor 248, tube B is once again rendered conductive as its grid voltage rises above the cut-off level, and when this occurs the multivibrator is instantaneously switched to the normal condition wherein tube B is conductive and tube A cut off. At this time the plate voltage of tube B is immediately lowered in value so that the voltage appearing on wire 260 is reduced abruptly to its normal value. However, for the time throughout which tube B is rendered nonconductive the required positive voltage appears on wire 260 so that the comparison of a hub and wheel rim signals can be effected in each of the dragging brake detection circuits 94 and 96.

The negative-going voltage variation which appears on wire 230 to effect the above-mentioned operation of the multivibrator included in the clear circuit 105 is obtained from either the flip-flop FF1 or the flip-flop FF2 dependent upon the direction of travel of the train. Thus, for a train moving from left to right, the relay D is dropped away as previously described so that wire 230 is then connected through back contact 107 of this relay D and through back contact 63 of the relay to the cathode of tube A of flip-flop FF2. From the description that has previously been given with respect to the operation of the flip-flops FF1 and FF2 it is apparent that there is a decrease in voltage at the plate of this tube A for a train moving from left to right only as the flip-flop FF2 is restored to its normal condition by each occurrence of an output pulse from thyratron T3 associated with the wheel detector WD3. In other words, after a passing wheel has in succession produced outputs from each of the wheel detectors WD1, WD2, and WD3, during which time the output of the radiometer has been interrogated to provide separate signals of both hub and rim temperatures, flip-flop FF2 is restored to its normal condition by the final output from wheel detector WD3. It is this latter happening that produces the negative-going voltage variation on wire 230 which sets the multivibrator into operation, and obviously this is the proper time in which to cause the positive-going voltage to appear on wire 270 so that the comparison between these two signals can be made. It should be noted that a positive-going voltage variation at the cathode of tube A of flip-flop FF2 can have no substantial effect upon the multivibrator of the clear circuit 105 since such positive-going pulse applied to the grid of the normally conductive tube B cannot appreciably affect the conduction of this tube.

For a train traveling in the opposite direction, i.e., from right to left, relay D is picked up as previously described and then wire 230 is connected through front contact 107 of this relay D and through front contact 62 of this relay to the cathode of tube B of flip-flop FF1. From the description previously given, it is apparent that a negative-going voltage variation will appear at the cathode of this tube for each passing wheel and for a train traveling in this direction only at the time each negative-going pulse is received from thyratron T1 associated with wheel detector WD1. In other words, as each wheel passes in succession over wheel detectors WD3, WD2, and WD1, the signals respectively representative of hub and rim temperatures are stored in their respective capacitors 222 and 223, and when the output is received from thyratron T1, these voltages are properly stored in the respective capacitors and it is then proper for a comparison of their amplitudes to be made. The negative-going pulse from the plate of thyratron T1 operates flip-flop FF1 to the condition wherein tube B is nonconductive and the resulting decrease in cathode potential produces the required negative-going voltage variation at the grid of tube B included in the multivibrator of the clear circuit 105 to cause it to produce the desired positive voltage on wire 260.

It is during the time that the multivibrator included in the clear circuit 105 is in the condition wherein tube B is nonconductive that the comparison of hub and wheel rim temperatures is made as described above. When the multivibrator is restored to its normal condition with tube B again fully conductive, this voltage is removed. At the same time, the negative-voltage variation at the plate of tube B is applied through capacitor 265 and resistor 266 to the grid of triode tube C. Tube C is operated as an inverter amplifier, similar to those previously described so that it provides a positive-going voltage at its plate for each negative-going voltage variation applied to its control grid. A positive-going voltage variation applied to the grid whenever tube B of the multivibrator is rendered nonconductive has no substantial effect upon the conduction of tube C since it only tends to drive the grid more positive and this has but little effect upon its conduction.

The positive-going voltage pulse obtained from the plate of tube C whenever the multivibrator of this clear circuit 105 is restored to its normal condition is applied to the grids of the tubes 219 included in both the dragging brake detection circuits 94 and 96. The increase in grid voltage obtained therefrom overcomes the normal cut-off bias applied to these tubes from the (—) terminal and through the respective grid resistors so that these are both momentarily rendered conductive. The effect thereof is to discharge fully the capacitors 222 and 223 and thereby render them susceptible to recharging as the next wheel arrives and is scanned by the radiometer. The diodes 274 and 275 are connected in parallel with the capacitors 222 and 223, respectively, and ensure that the upper terminal of each capacitor cannot become more negative than ground when the associated tube is rendered conductive to discharge such capacitor.

MODIFICATIONS

FIG. 6, which has already been described, shows a conventional track circuit including a track battery connected to the track rails at one end and a track relay connected to the rails at the other end. Back contact 117 of this track relay TR controls a stick circuit for the energization of relay SCR. FIG. 10 shows an alternative means of controlling the stick circuit of relay SCR employing an electronic track circuit in place of the conventional track circuit. Thus, an electronic transmitter generating an alternating current signal of a particular frequency applies its output to the primary winding of a transformer TR7. A receiver is also employed which is particularly tuned to respond to the frequency of output of the transmitter and in response thereto energizes the track relay TR'. This receiver receives its input from the secondary winding of a transformer TR8. The secondary winding of transformer TR7 is coupled to the primary winding of transformer TR8 only through the medium of the track rails. When no train is present, there can be no coupling between these two transformer windings so that the receiver then receives no input signal from the transmitter and the relay TR' is then dropped away. However, when a train is present within the vicinity of the location where the connections are made to the track rails, the shunting effect of such train provides a relatively low impedance between these two connections and thereby permits the coupling of energy from the one transformer winding to the other so that the receiver then receives an input signal from the transmitter output and the relay TR' is picked up. The contact 117' of this relay controls the shutter control relay SCR of FIG. 6 in exactly the same manner as does the contact 117 of track relay TR shown in such FIG. 6.

FIGS. 11A and 11B show a metal back plate 331 having a rotary solenoid 332 connected thereto by means of bolts 333 and 334. A shaft 335 of the solenoid 332 is attached to a connector 336 which is connected to a metal shutter 337 by means of screws 338, 339 and 340. A cylindrical weight 342 is connected to one end of the shutter 337 by means of a screw 343. The cylindrical weight 342 is adapted to partially rest against a resilient cylinder 345 in one position of the shutter 337 and is adapted to partially rest against another resilient cylinder 346 in another position of the shutter 337. The shutter 337 and its associated elements are shown to be employed with the radiometer RD1 in FIG. 11B. Referring to FIG. 11B, it is seen that the back plate 331 is spaced from the side 29 of the radiometer RD1 by the spacers 348 and 349 which have, respectively, bolts 350 and 351 inserted through central bores therein which are effective to hold the shutter 337 in a position to exclude all extraneous heat radiation and light coming through the filter 22 from the detector assembly D1 and light meter LM1 included with the radiometer RD1. The shutter 337 may be operated to the position shown in dotted lines in FIG. 11A when the solenoid 332 is energized via the wires 352 and 353 in the manner shown in FIG. 6. During the operation of solenoid 332, a spring included in the housing 355 is adapted to be wound in accordance with the rotation of shaft 335. Upon the deenergization of solenoid 332, such spring is then adapted to cause the shutter 337 to return to its normal position as shown by the solid lines in FIG. 11A. The bearings 357, 358 and 359 (not shown) are adapted to facilitate in the rotation of the shaft 335.

FIG. 6 shows the recorder as being directly controlled by the relay R through front contact 77 in a manner to keep it active so long as and only so long as wheels recurringly pass the detectors WD. FIG. 12 shows an alternative means for controlling the recorder so that it is maintained active so long as the relay SCR is picked up. In FIG. 6 the relay SCR is maintained picked up so long as there is a train in the associated track section and unless the light meter LM2 detects an excessive amount of light at which time relay LR picks up and opens the stick circuit for relay SCR. In FIG. 12 the stick circuit of relay SCR additionally includes the contacts 360 and 361 of time element TE so that should a train remain in the track section for protracted period the stick circuit for relay SCR would be opened after a predetermined time. This means that a train may enter the train section and pass partway through it, but a predetermined time after its entrance the relay SCR would be released assuming that the train had stopped and would thus stop the operation of the recorder. This avoids a waste of paper and yet provides that the recorder is controlled in the same manner as the shutter in FIG. 6.

Having described a system for detecting hot elements on railway vehicles as one specific embodiment of this invention, I desire it to be understood that the various forms shown have been selected particularly to facilitate in the disclosure of this invention and not to limit the number of forms that it may assume. I desire it to also be understood that various other modifications, adaptations and alterations may be made to the specific form shown to meet the requirements of practice without in any manner departing from the spirit or scope of this invention.

What I claim is:

1. In a system for detecting the presence of overheated elements on railway cars passing a detector location the combination comprising, detector means at said location including an infrared responsive means and means for imaging upon said infrared responsive means the infrared radiations emitted by a first portion of each car wheel including its hub as each axle of said car passes said location, wherefore said infrared responsive means also necessarily has imaged thereupon a second portion of each wheel outwardly of said hub and including its web and rim, car position responsive means for demarcating a first interval encompassing the time throughout which the radiations from at least a part of said hub of a given wheel are imaged upon said infrared responsive means and for demarcating a second interval encompassing the time throughout which the radiations from at least part of said second wheel portion of said given wheel are imaged upon said infrared responsive means, means governed by both said infrared responsive means and said car position responsive means for providing first and second signals representative of the infrared radiations impinging upon said infrared responsive means during said first and second intervals respectively, and means for comparing said first and second signals and for providing an output signal indicating an overheated condition of at least one of said first and second wheel portions of said given car wheel only when the amplitude of the corresponding one of said first and second signals exceeds a predetermined value and exceeds in amplitude the other of said signals.

2. A system for detecting and recording the overheating of either of two different portions of a wheel of a railway car upon passage of the car along a stretch of railway track comprising,
   (a) a plurality of wheel detectors disposed at intervals along said stretch of track subject to actuation successively by said wheel, the distance between first and last detectors of said plurality of detectors being less than the minimum spacing between axles of the car,
   (b) gating means controlled by said wheel detectors for forming first and second gating intervals, said first gating interval being initiated by the actuation of said first detector and said second gating interval being terminated by the actuation of said last detector,
   (c) detector means disposed at a point along said stretch of track having an element sensitive to infrared radiation and means for imaging upon said element the infrared radiations emitted by a plurality of radial portions of said wheel respectively while scanning said wheel at a predetermined elevational level upon progress of said car, said detector means being operable to generate a signal continuously variable in accordance with the degree of heat of the portion of the wheel being scanned, and
   (d) means for comparing the signal of said detector means when its element is imaged on one radial portion of the wheel during the first gating interval with the signal of said detector means when its element is imaged on another radial portion of the wheel during the second gating interval and for registering whether one of said portions or another of said wheel is heated to a higher temperature.

3. The invention according to claim 2 wherein recording means is provided having distinctive portions for recording high temperatures registered by said comparing means for said one portion and said another portion respectively.

4. The invention according to claim 2 wherein threshold control means is provided for permitting the registration of the heating of either of said portions of said wheel only provided the temperature of that portion is above a predetermined normal temperature.

5. A system for detecting and registering the overheating of a journal associated with a wheel of a railway car upon passage of a car along a stretch of railway track comprising,
   (a) detector means disposed at a point along said stretch of track having an element sensitive to infrared radiation and having means for imaging upon said element during passage of the car the infrared radiations emitted by a plurality of radial portions of said wheel respectively upon scanning said wheel at a predetermined elevational level including a portion of the wheel hub, said detector means being operable to generate a signal continuously variable in accordance with the degree of heat of the portion of the wheel upon which said element is imaged,
   (b) registration means operable when rendered effective for registering the detection of an overheated journal associated with said wheel in accordance with a signal generated by said detector means indicative of high temperature when imaged on a hub portion of said wheel, and,
   (c) control means for rendering said registration means effective to register detection of an overheated journal only provided that the signal generated by said detector when imaged on said hub is indicative of a higher temperature than the signal when the detector element is imaged on another radial portion of said wheel during the scanning of said wheel by said detector at said predetermined level.

6. The invention according to claim 5 wherein said registration means includes a recorder having instruments for recording separately a high temperature of a wheel hub and a high temperature of another portion of a car wheel radially displaced from the hub of the wheel.

7. The invention according to claim 5 wherein said control means includes gating means having wheel detector devices actuated by said car wheel to initiate and terminate respectively two distinct gating periods for obtaining signals from said detector means indicative of temperatures of respective distinctive wheel portions at said predetermined elevational level.

8. A system for detecting and registering the overheating of either of two portions of a wheel of a railway car upon passage of the car along a stretch of railway track comprising,
   (a) detector means disposed at a point along said stretch of track having an element sensitive to infrared radiation and having means for imaging upon said element during the passage of the car the infrared radiations emitted by said wheel while scanning a plurality of different radial portions of said wheel at a predetermined elevational level including a portion of the wheel hub, said detector means being operable to generate a signal continuously variable in accordance with the degree of heat of the portion of the wheel being scanned,
   (b) gating means including wheel detectors subject to actuation by said car wheel for forming first and second gating intervals for registration of temperatures of first and second of said radial portions of said car wheel respectively as detected by said detector means,
   (c) storage means for storing the signal corresponding to the temperature of said first radial portion until after registration of the temperature of said second radial portion,
   (d) means for comparing the signal indicative of the temperature of said first and second radial portions of the wheel, and
   (e) means controlled by said comparing means for registering which of the two radial portions has the highest temperature.

References Cited by the Examiner

UNITED STATES PATENTS

| | | | |
|---|---|---|---|
| 2,066,309 | 1/37 | Allen | 246—107 |
| 2,089,835 | 8/37 | Logan | 246—29 |
| 2,139,707 | 12/38 | Van Denburg | 81—1 |
| 2,193,074 | 3/40 | O'Hagan | 246—107 |
| 2,419,099 | 4/47 | Wall. | |
| 2,818,508 | 12/57 | Johanson et al. | 246—169 X |
| 2,829,267 | 4/58 | Howell | 246—169 |
| 2,856,539 | 10/58 | Orthuber et al. | 246—169 |
| 2,880,309 | 3/59 | Gallagher et al. | 246—169 |
| 2,896,068 | 7/59 | Aver et al. | 246—34 |
| 2,906,885 | 9/59 | Orthuber et al. | 246—169 X |
| 2,961,545 | 11/60 | Astheimer et al. | |
| 2,963,575 | 12/60 | Pelino et al. | 246—169 |
| 2,970,210 | 1/61 | Willey | 246—169 |
| 2,999,151 | 9/61 | Rosett | 246—169 |
| 3,025,393 | 3/62 | Crain | 246—34 X |

(Other references on following page)

UNITED STATES PATENTS 3,065,347   11/62   Bossart _____ 246—169 X
3,076,090   1/63    Stapelfeldt _____ 246—169
3,095,171   6/63    Gallagher et al. _____ 246—169

FOREIGN PATENTS 69,401      7/58    France.
1,002,381   2/57    Germany.
1,031,338   6/58    Germany.
836,721     7/60    Great Britain.
328,951     5/58    Switzerland.

OTHER REFERENCES

New Detector Tags Hotboxes in the October 1959 issue of Modern Railroads, page 87.

LEO QUACKENBUSH, *Primary Examiner.*